(12) United States Patent
Hashimoto et al.

(10) Patent No.: US 8,139,466 B2
(45) Date of Patent: Mar. 20, 2012

(54) RECORDING AND REPRODUCING DEVICE

(75) Inventors: Makoto Hashimoto, Utsunomiya (JP); Hiroshi Minematsu, Zama (JP); Akihisa Matsumoto, Sakura (JP); Shohji Takada, Yaita (JP); Kimiyoshi Itoh, Nasushiobara (JP); Harumi Sakamoto, Utsunomiya (JP); Noriaki Itai, Tochigi (JP); Seiji Usami, Utsunomiya (JP); Yutaka Itoh, Hirakata (JP); Shuhki Ohtani, Tochigi (JP); Hiroshi Mikuni, Otawara (JP)

(73) Assignee: Sharp Kabushiki Kaisha, Osaka (JP)

( * ) Notice: Subject to any disclaimer, the term of this patent is extended or adjusted under 35 U.S.C. 154(b) by 850 days.

(21) Appl. No.: 11/664,294

(22) PCT Filed: Sep. 5, 2005

(86) PCT No.: PCT/JP2005/016248
§ 371 (c)(1),
(2), (4) Date: Jun. 29, 2007

(87) PCT Pub. No.: WO2006/038410
PCT Pub. Date: Apr. 13, 2006

(65) Prior Publication Data
US 2008/0075415 A1    Mar. 27, 2008

(30) Foreign Application Priority Data

Sep. 30, 2004 (JP) ................................ 2004-288956
Nov. 10, 2004 (JP) ................................ 2004-327073

(51) Int. Cl.
*H04N 5/91* (2006.01)
*H04N 5/95* (2006.01)

(52) U.S. Cl. ................ 369/192.1; 369/30.25; 369/60.28
(58) Field of Classification Search ............... 369/30.03, 369/30.06, 30.25, 24.01, 30.28, 30.92, 192.1
See application file for complete search history.

(56) References Cited

U.S. PATENT DOCUMENTS

| | | | |
|---|---|---|---|
| 5,668,790 A | 9/1997 | Koizumi et al. | |
| 5,740,135 A | 4/1998 | Nakagawa et al. | |
| 5,963,530 A * | 10/1999 | Ward | 369/85 |
| 6,212,147 B1 * | 4/2001 | Ishihara | 720/612 |
| 6,867,701 B2 * | 3/2005 | Lawrence et al. | 340/635 |
| 2003/0067696 A1 | 4/2003 | Maeda et al. | |
| 2003/0155479 A1 | 8/2003 | Kishi et al. | |
| 2003/0169651 A1 | 9/2003 | Kobayashi | |
| 2004/0179445 A1 * | 9/2004 | Park et al. | 369/47.14 |
| 2004/0179464 A1 * | 9/2004 | Maruyama et al. | 369/292 |
| 2004/0190416 A1 | 9/2004 | Kakiuchi | |

(Continued)

FOREIGN PATENT DOCUMENTS
EP        1 195 284 A2    4/2002
(Continued)

*Primary Examiner* — Will J Klimowicz
*Assistant Examiner* — Andrew Sasinowski
(74) *Attorney, Agent, or Firm* — Birch, Stewart, Kolasch & Birch, LLP

(57) ABSTRACT

A recording/reproducing device (A) includes: a first device (31) for performing recording and/or reproduction of data with respect to a first detachable storage medium; a second device (35) for performing recording and/or reproduction of data with respect to a second detachable storage medium; a first display section (41) for notifying a working state of the first device (31); and a second display section (47) for notifying a working state of the second device (35). A relative positions of the first device (31) to the second device (35) is the same as a relative position of the first display section (41) to the second display section (47).

17 Claims, 17 Drawing Sheets

U.S. PATENT DOCUMENTS

| | | | |
|---|---|---|---|
| 2004/0190865 A1* | 9/2004 | Nomura et al. | 386/46 |
| 2005/0007898 A1* | 1/2005 | Maeda | 369/30.38 |
| 2005/0111328 A1* | 5/2005 | Potyrailo et al. | 369/53.25 |
| 2005/0190687 A1* | 9/2005 | Iida et al. | 369/275.4 |

FOREIGN PATENT DOCUMENTS

| | | |
|---|---|---|
| JP | 58-62408 U | 4/1983 |
| JP | 3-49088 A | 3/1991 |
| JP | 05-210963 A | 8/1993 |
| JP | 6-109980 | 4/1994 |
| JP | 07-219463 A | 8/1995 |
| JP | 08-055397 A | 2/1996 |
| JP | 10-222973 A | 8/1998 |
| JP | 11-110858 A | 4/1999 |
| JP | 2002-109870 A | 4/2002 |
| JP | 2003-045169 A | 2/2003 |
| JP | 2003-242764 A | 8/2003 |
| JP | 2003-288771 A | 10/2003 |
| JP | 2004-103135 A | 4/2004 |
| JP | 2004-192801 A | 7/2004 |
| JP | 2004-280976 A | 10/2004 |
| TW | 269735 | 2/1996 |
| TW | 270200 | 2/1996 |
| TW | 584847 | 4/2004 |
| TW | 594687 | 6/2004 |

* cited by examiner

Entire Functional Block Diagram

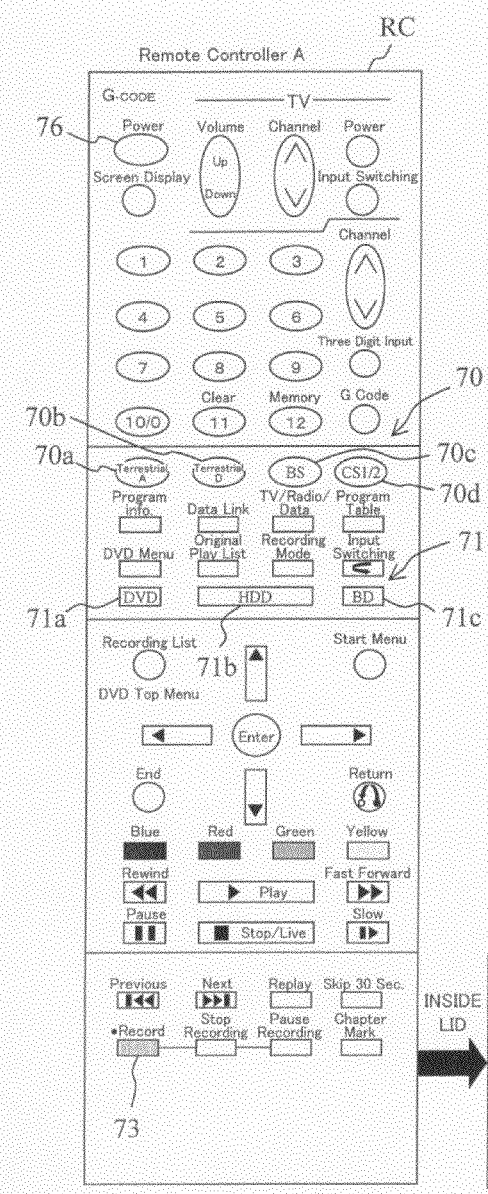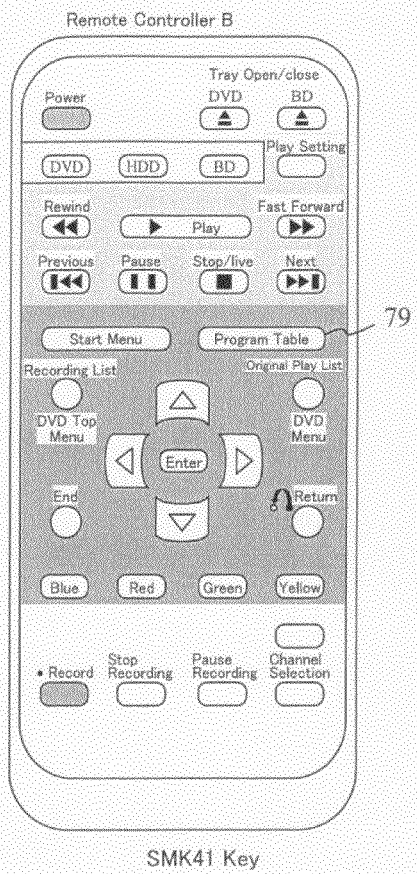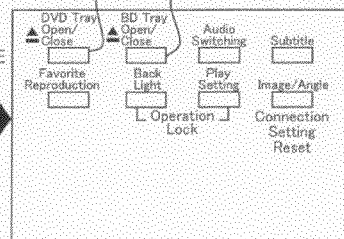

FIG. 11
1) During HDD Mode (Power ON)
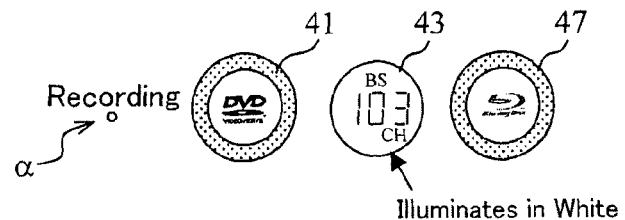
2) During DVD Mode (Power ON)
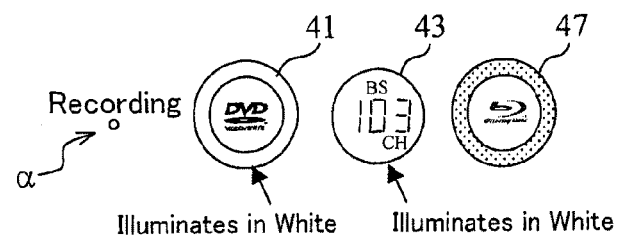
3) During BD Mode (Power ON)
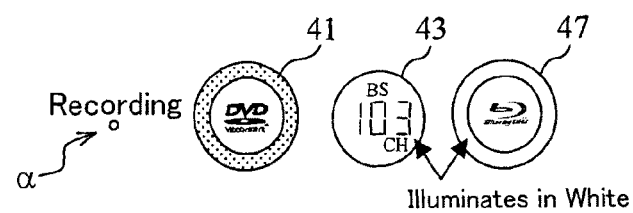
4) During HDD-Recording
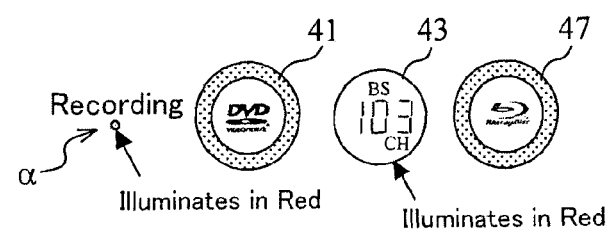
5) During HDD-Reproduction
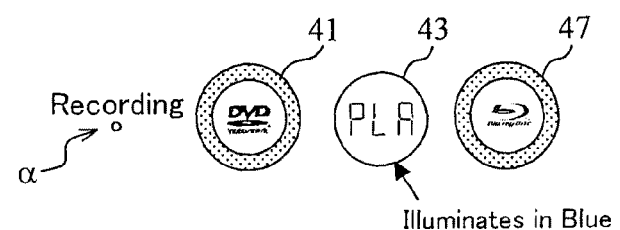

FIG. 12
1) During DVD-Recording
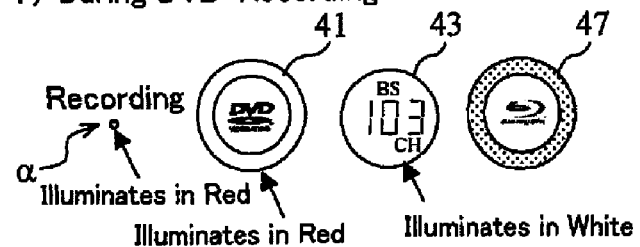
2) During DVD-Reproduction
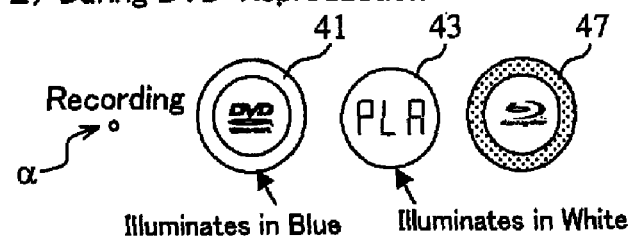
3) During BD-Recording
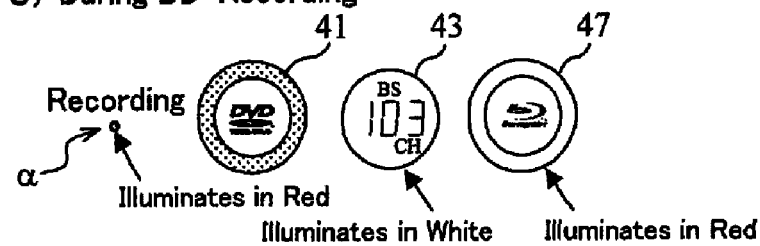
4) During BD-Reproduction
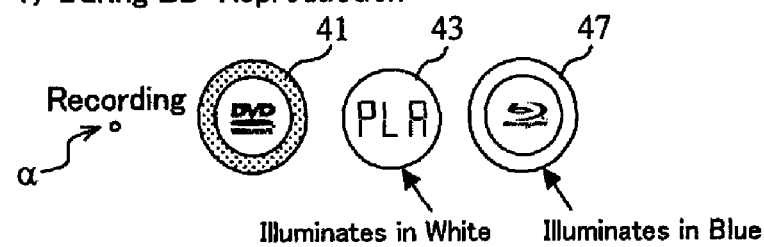
5) During HDD-Recording-and-Reproduction
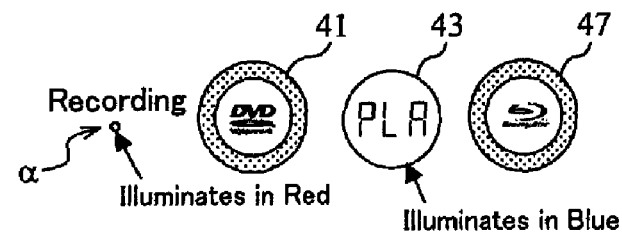

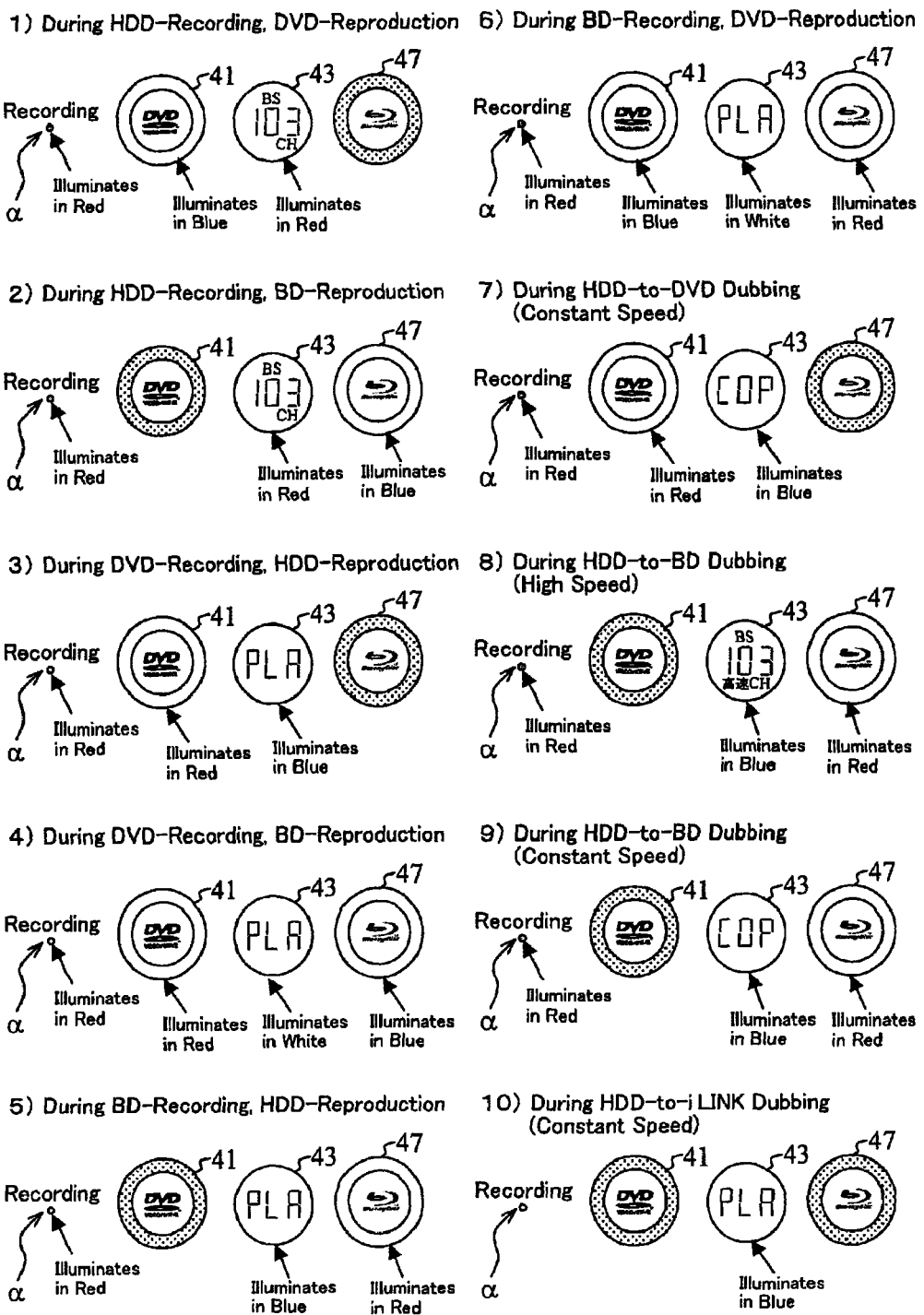

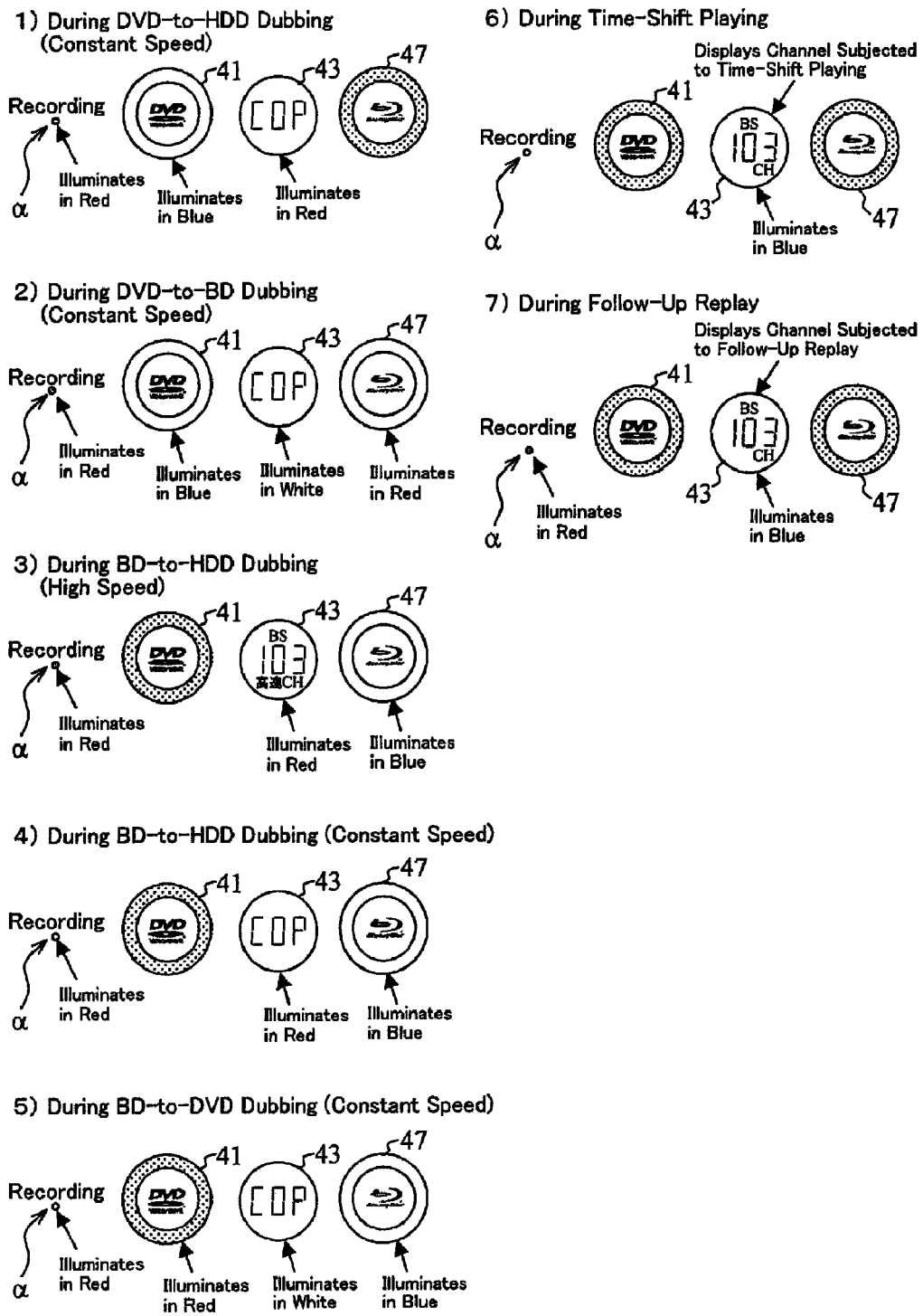

FIG. 15 (a)

(1) During Tuner-Reception  (2) During External AV Input  (3) During DV Input  (4) During i.Link Input

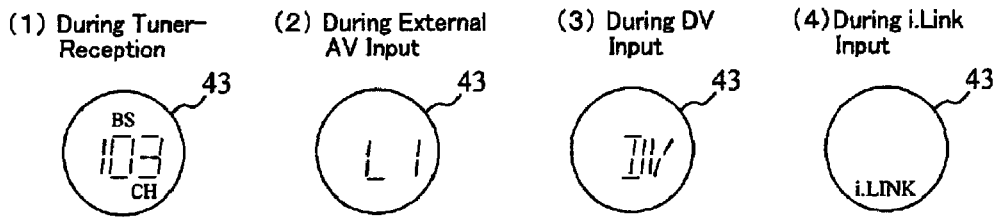

FIG. 15 (b)

(1) During Dubbing (Copying): Displays the Following at 2Hz (Repetitively)

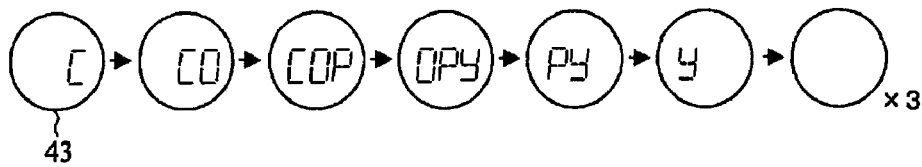

(2) During Dubbing (Moving): Displays the Following at 2Hz (Repetitively)

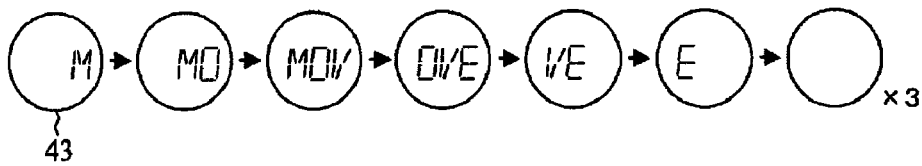

(3) During Reproduction: Displays the Following at 2Hz (Repetitively)

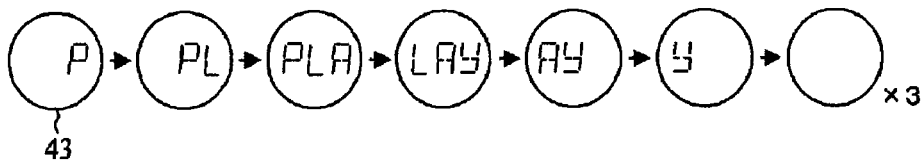

(4) During Download via Satellite    (5) During B-CAS Communications    (6) When Acquiring Terrestrial Digital EPG    (7) When Displaying Program Table

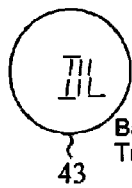 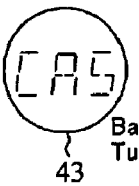 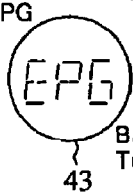 

Backlight Turned Off (for 4, 5, 6)

FIG. 16 (a)
Displaying at the Time of Starting Up
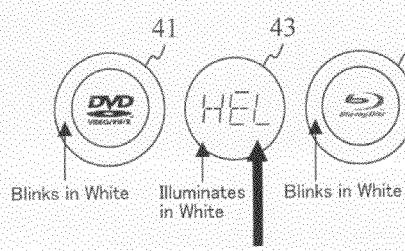
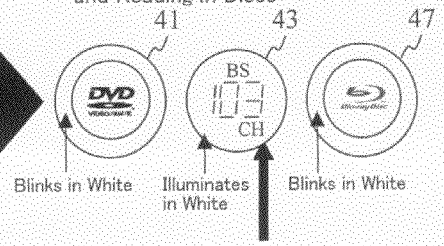
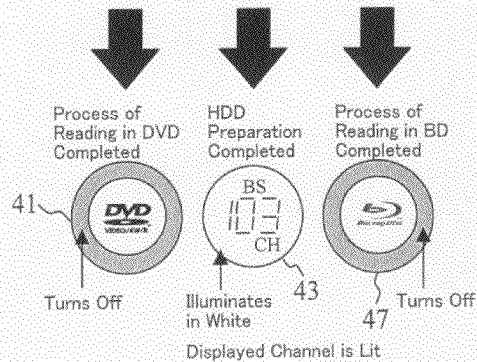
FIG. 16 (b)
Displaying at the Time of Reading in Discs (at the Time of Closing Tray)
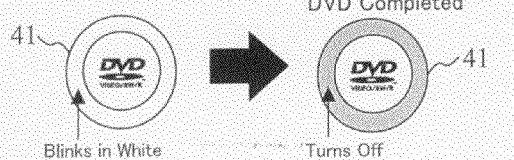
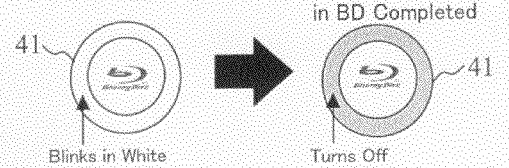

RECORDING AND REPRODUCING DEVICE

TECHNICAL FIELD

The present invention relates to a recording/reproducing device, and in particular, relates to a display control technology of a recording/reproducing device whose casing includes a plurality of disc drive devices.

BACKGROUND ART

To meet the demands of the multimedia age, recent recording/reproducing devices generally have: a DVD device capable of handling a DVD (Digital Versatile Disk) which is a storage medium for large volume data; and a hard disk device (HDD: Hard Disc Drive) which is a device with a large storage capacity available at a low price.

In the DVD device, a pickup for an optical disc uses a red semiconductor laser whose wavelength is in 650 nm band. The storage capacity of typical DVD is 4.7 giga bytes (GB).

Meanwhile, as a next generation optical disc having a larger data storage capacity than a DVD, a blue-ray disc (Blue-ray Disc®; hereinafter, BD) and a HD DVD (High Definition DVD) are recently introduced, each of which uses a blue light source whose wavelength is in 400 nm band.

For example, there are following three standardized storage capacities for single-side single-layer BDs: 23.3 GB, 25 GB, and 27 GB. For HD DVD, there is a single-side single-layer HD DVD having a storage capacity of 15 GB, and an HD DVD of 20 GB is being discussed. Both of the above discs have a storage capacity of 15 GB or more. Thus, for example, a single BD is capable of storing therein the entire two-hours long Hi-vision broadcast. The performance of these discs are therefore excellent to fit in the new age of Hi-vision broadcasting (See Patent Citation 3 for example).

For compatibility with BDs and HD DVDs in addition to already-existing compact discs (CDs) and DVDs, suggested is an optical disc device provided with a laser light source of the following three wavelengths: a long wavelength (for CDs), a medium wavelength (for DVDS), and a short wavelength (for BDs and HD DVDs) (See Patent Citation 2 for example). In such an optical disc device, a pickup supporting the above-mentioned three wavelengths is provided. With this arrangement, only a single drive is required and the space can be reduced.

(Patent Citation 1) Japanese Unexamined Patent Publication No. 288771/2003 (Tokukai 2003-288771; Published on Oct. 10, 2003)

(Patent Citation 2) Japanese Unexamined Patent Publication No. 103135/2004 (Tokukai 2004-103135; Published on Apr. 2, 2004)

(Patent Citation 3) Japanese Unexamined Patent Publication No. 192801/2004 (Tokukai 2004-192801; Published on Jul. 8, 2004)

However, even though the space-saving is possible in the optical disc device of Patent Citation 2, the optical disc device only has a single disc inserting slot, which means that the optical disc can drive only one disc. Therefore, insertion/ejection of a disc and internal processing accompanied therewith at a time of dubbing or the like is complicated. This is not necessarily advantageous in terms of user-friendliness. There is a recording/reproducing device provided with two or more disc devices in addition to a BD drive, as is disclosed in Patent Citation 1; however, there is no description regarding operation states of such a recording/reproducing device. Further, in the device of Patent Citation 2, the operation states of disc devices are separately indicated mainly in the form of text information on the display regions nearby the disc devices, respectively. Thus, for example, in a case where three or more kinds of recording/reproducing sections are provided inside a recording/reproducing device, it has been extremely difficult for a user to confirm at a glance the current state of a joint operation performed by a recording section and a reproducing section.

In a case of a DVD or a BD, when a user turns on an intended device and starts a recording, it takes approximately 15 to 20 seconds before the actual start of writing in signals in a disc storage medium. Once the disc storage medium is taken out, It takes a double of this time before the preparation of the recording is completed again. This caused demand for improvement in the user-friendliness. For this reason, in an apparatus having a recording/reproducing device with plural recording or reproducing sections, demanded is a recording/reproducing device having display means which allows the user to confirm at a glance the current working state of each recording/reproducing section, thereby improving the operationality of the recording/reproducing sections.

The following explains the Patent Citation 1 more specifically. The Patent Citation 1 discloses a "twin deck type" audio apparatus for use in reproducing/recording data in/from a disc. The apparatus adopts a dual-tray method which uses a read-only drive and a write-only drive. The apparatus further includes a single display section which allows a user to visually confirm a recording state.

In the structure of Patent Citation 1, the display section shows the following information to the user: read-operation information indicating the operation state of the read-only drive; and write-operation information indicating the operation state of the write-only drive.

However, with a single display section for displaying the both information items, it is difficult for a user to confirm at a glance whether the information displayed is the recording-operation information or the reproduction-operation information.

An object of the present invention is to provide a recording/reproducing device having plural drivers, which device is more convenient than a conventional recording/reproducing device.

DISCLOSURE OF THE INVENTION

A recording/reproducing device according to the present invention comprises: a first device for performing writing and/or reading of data with respect to a removable first storage medium; a second device for performing writing and/or reading of data with respect to a removable second storage medium; a first display section for notifying a working state of the first device; and a second display section for notifying a working state of the second device, a relative position of the first device to the second device being the same as a relative position of the first display section to the second display section.

A recording/reproducing device according to the present invention comprises: a first device for performing writing and/or reading of data with respect to a first storage medium removable via a first insertion/ejection slot; a second device for performing writing and/or reading of data with respect to a second storage medium removable via a second insertion/ejection slot; a first display section for notifying a working state of the first device; and a second display section for notifying a working state of the second device, a relative position of the first device to the second device being the same as a relative position of the first display section to the second display section, a relative position of the first insertion/ejection slot to the second insertion/ejection slot being the same as a relative position of the first display section to the second display section.

The above-described recording/reproducing device displays information related to working states of the first and second devices in such a manner that the information is easy to visually recognize. Therefore, a user is able to recognize at a glance the working states of the first and second devices.

A recording/reproducing device according to the present invention comprises within a single casing a plurality of recording/reproducing sections for performing writing and/or reading of data with respect to storage mediums, at least a first recording/reproducing section and a second recording/reproducing section of the plurality of recording/reproducing sections having individual insertion/ejection slots, the recording/reproducing device including a first display section for notifying a working state of the first recording/reproducing section and a second display section for notifying a working state of the second recording/reproducing section, the first display section and the second display section being provided on one of the external faces of the casing, opposed to an insertion/ejection slot of the first recording/reproducing section and an insertion/ejection slot of the second recording/reproducing section, respectively.

A recording/reproducing device according to the present invention comprises within a single casing a plurality of recording/reproducing sections for performing writing and/or reading of data with respect to storage mediums, at least a first recording/reproducing section and a second recording/reproducing section of the plurality of recording/reproducing sections having individual insertion/ejection slots, the casing includes a movable panel which covers the insertion/ejection slots, the recording/reproducing device including a first display section for notifying a working state of the first recording/reproducing section and a second display section for notifying a working state of the second recording/reproducing section, the first display section and the second display section being provided to be opposed to an insertion/ejection slot of the first recording/reproducing section and an insertion/ejection slot of the second recording/reproducing section, respectively, the first display section and the second display section being provided on a plane of the panel, which plane is a reverse side of a plane facing the insertion/ejection slots.

The above-described recording/reproducing device displays information related to working states of plural recording/reproducing sections in such a manner that the information is easy to visually recognize. Therefore, a user is able to recognize at a glance the working states of the plural recording/reproducing sections.

A recording/reproducing device according to the present invention comprises: a device body; a first recording/reproducing section, provided inside the device body, for performing writing and/or reading of data with respect to a first storage medium; a second recording/reproducing section, provided in the device body, for performing writing and/or reading of data with respect to a second storage medium; a first display section, formed on an external surface of the device body, for displaying operation information indicating an operation state of the first recording/reproducing section; and a second display section, formed on an external surface of the device body, for displaying operation information indicating an operation state of the second recording/reproducing section, wherein: the first display section, the second display section, the first device and the second device are laid out so that a quadrangle is formed by: a first line segment connecting the first display section and the second display section; a second line segment connecting the first device and the second device; a third line segment connecting the first display section and the first device; a forth line segment connecting the second display section and the second device, where the first and second line segments are opposed, and the third and fourth line segments are opposed.

With this configuration, the alignment order of the first display section and the second display section appears to the same as the alignment order of the first recording/reproducing section and the second recording/reproducing section to the user when viewed from the opposite side of the first and second display sections formed on the external plane of the device body. Thus, based on the alignment order of the first and the second display sections, the user is easily able to specify which display section indicates the operation information of which disc device. The recording/reproducing device A is thus user-friendly.

Additional objects, features, and strengths of the present invention will be made clear by the description below. Further, the advantages of the present invention will be evident from the following explanation in reference to the drawings.

BRIEF DESCRIPTION OF THE DRAWINGS

FIG. 3(*b*) is a front view of the recording/reproducing device corresponding to FIG. 2, and is showing the recording/reproducing device of FIG. 1 and FIG. 2. FIG. 3(*c*) is a top view of the recording/reproducing device corresponding to FIG. 2, and is showing a part of the recording/reproducing device of FIG. 1 and FIG. 2.

FIG. 7(*a*) is a diagram showing an exemplary configuration of a remote control device (hereinafter also referred to as remote control device) which allows an operation of the recording/reproducing device from a distance, the remote controller being capable of operating both a television and the recording/reproducing device. FIG. 7(*b*) is a diagram showing a remote control device which allows an operation of the recording/reproducing device from a distance, the remote control device being only for the recording/reproducing device.

FIG. 11 is a pattern diagram of each display section on the front panel, and is showing examples of displaying according to operation conditions of the recording/reproducing devices, which examples differ from those of FIG. 10.

FIG. 12 is a pattern diagram of each display section on the front panel, and is showing examples of displaying according to operation conditions of the recording/reproducing devices, which examples differ from those of FIG. 10 and FIG. 11.

FIG. 13 is a pattern diagram of each display section on the front panel, and is showing examples of displaying according to operation conditions of the recording/reproducing devices, which examples differ from those of FIG. 10 through FIG. 12.

FIG. 14 is a pattern diagram of each display section on the front panel, and is showing examples of displaying according to operation conditions of the recording/reproducing devices, which examples differ from those of FIG. 10 through FIG. 13.

FIG. 15(a) is a pattern diagram of a second display section formed on the front panel, and is showing examples of text displayed according to operation conditions of the recording/reproducing device. FIG. 15(b) is a pattern diagram of a second display section formed on the front panel, and is showing examples of text displayed and scrolled according to operation conditions of the recording/reproducing device.

FIG. 16(a) is a pattern diagram of each display section on the front panel, and is showing an exemplary displaying according to operation conditions of the recording/reproducing device. In this figure shown is an example of displaying at the time of turning on the power of the recording/reproducing device. FIG. 16(b) is a pattern diagram of each display section on the front panel, and is showing an exemplary displaying according to operation conditions of the recording/reproducing device. In this figure shown is an example of displaying at the time of reading in a disc.

BEST MODE FOR CARRYING OUT THE INVENTION

For example, an optical disc in the present specification encompasses: a read-only optical disc such as CD-ROM and DVD-ROM; a readable and writable optical disc such as CD-R(W) and DVD-R(RW); BD (Blu-Ray Disc®); and HD DVD. An optical disc device is a drive device capable of driving these medium.

In the following description, an optical disc in compliance with any one of the standards of DVD-ROM, DVD-R(RW), DVD-RAM, DVD+R(RW), or HD DVD is simply referred to as "DVD, and an optical disc in compliance with the blue-ray standard is simply referred to as "BD".

Figure 1:
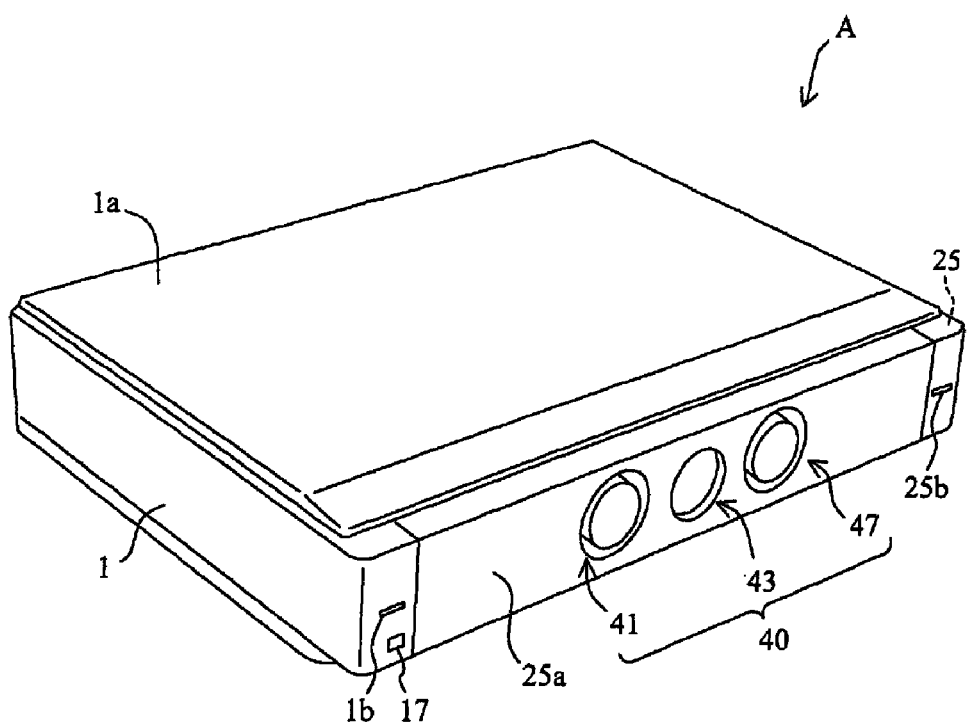
FIG. 1 is a perspective view of an exemplary exterior configuration of a recording/reproducing device of the an embodiment, and is showing a state where a front panel is closed.
Figure 2:
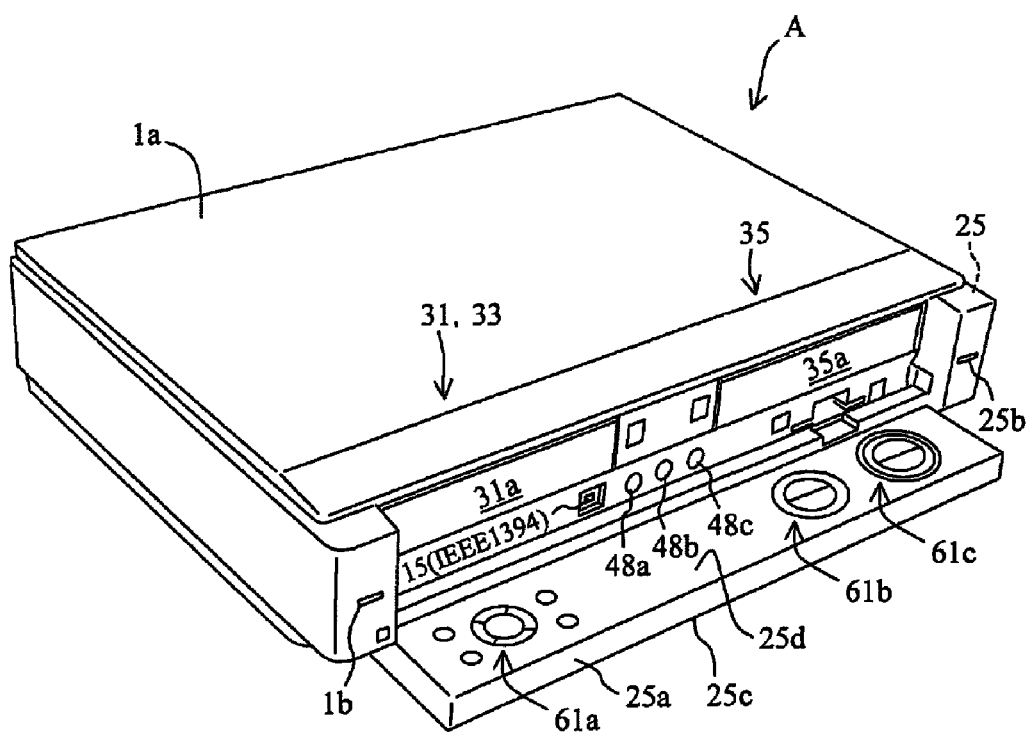
FIG. 2 is a perspective view of the recording/reproducing device shown in FIG. 1, showing a state where the front panel is open.
Figure 4:
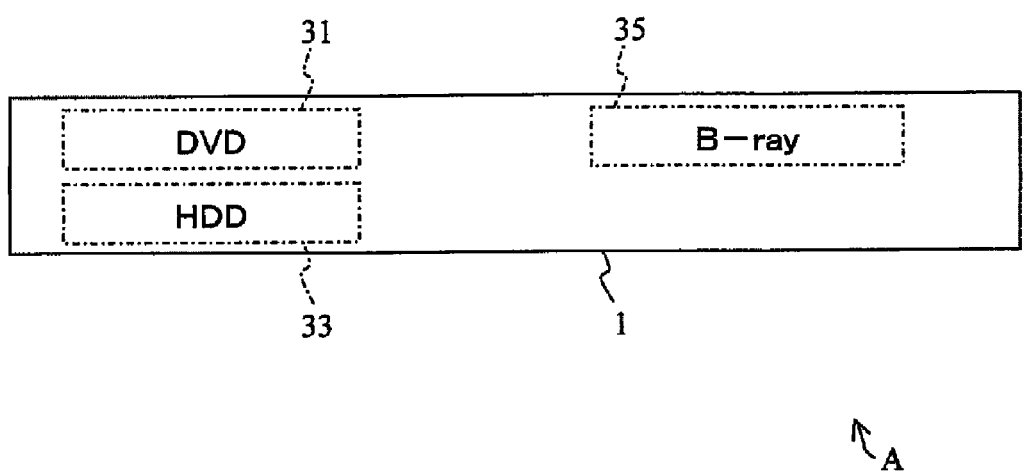
FIG. 4 is a diagram showing an exemplary arrangement of disc devices laid out inside the recording/reproducing device of the present embodiment.
Figure 5:
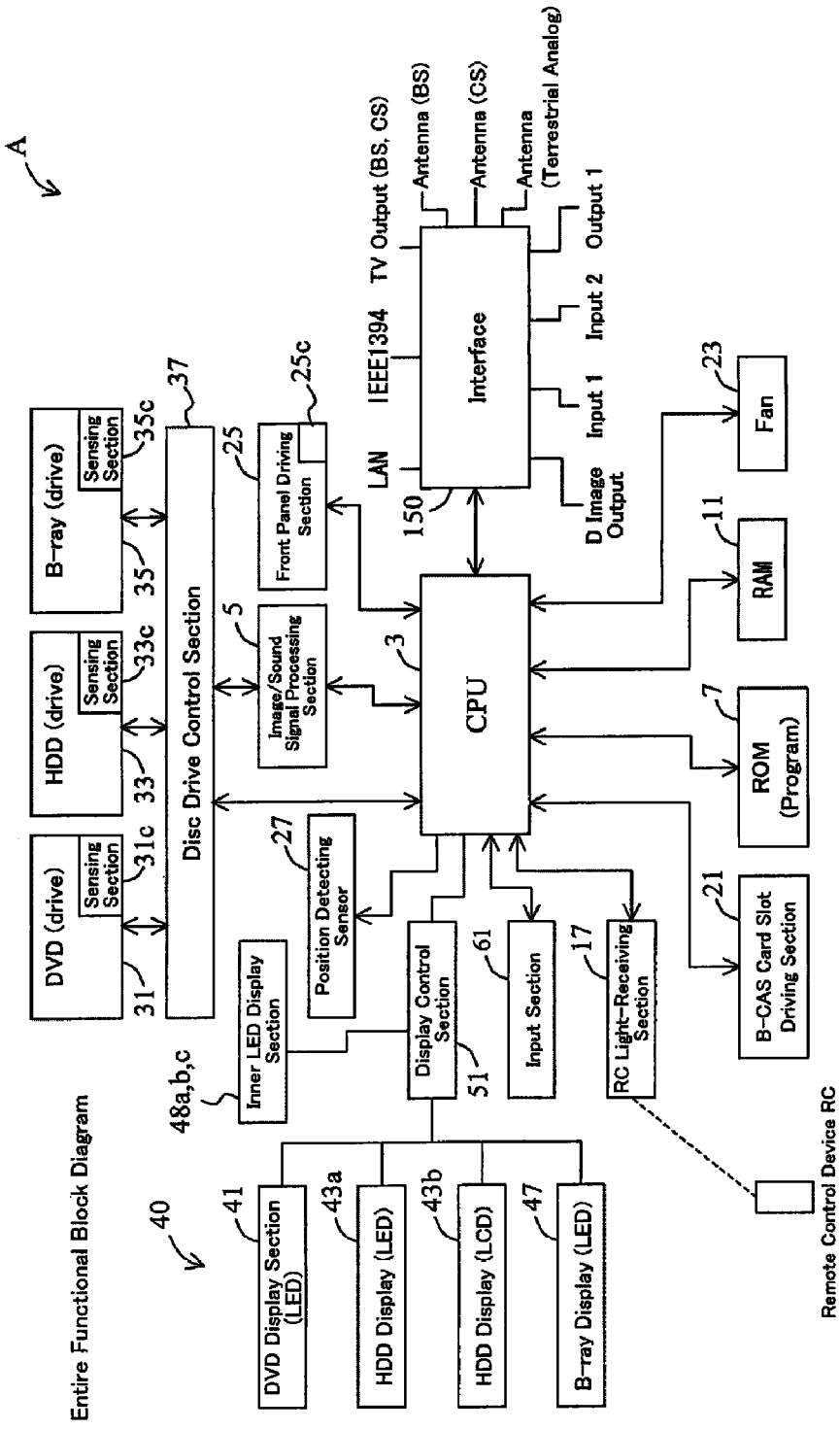
FIG. 5 is a functional block diagram showing an exemplary internal configuration of the recording/reproducing device of the present embodiment.
Figure 6:
FIG. 6 is a diagram showing various programs for performing control process or the like in the recording/reproducing device of the present embodiment.
Figure 8:
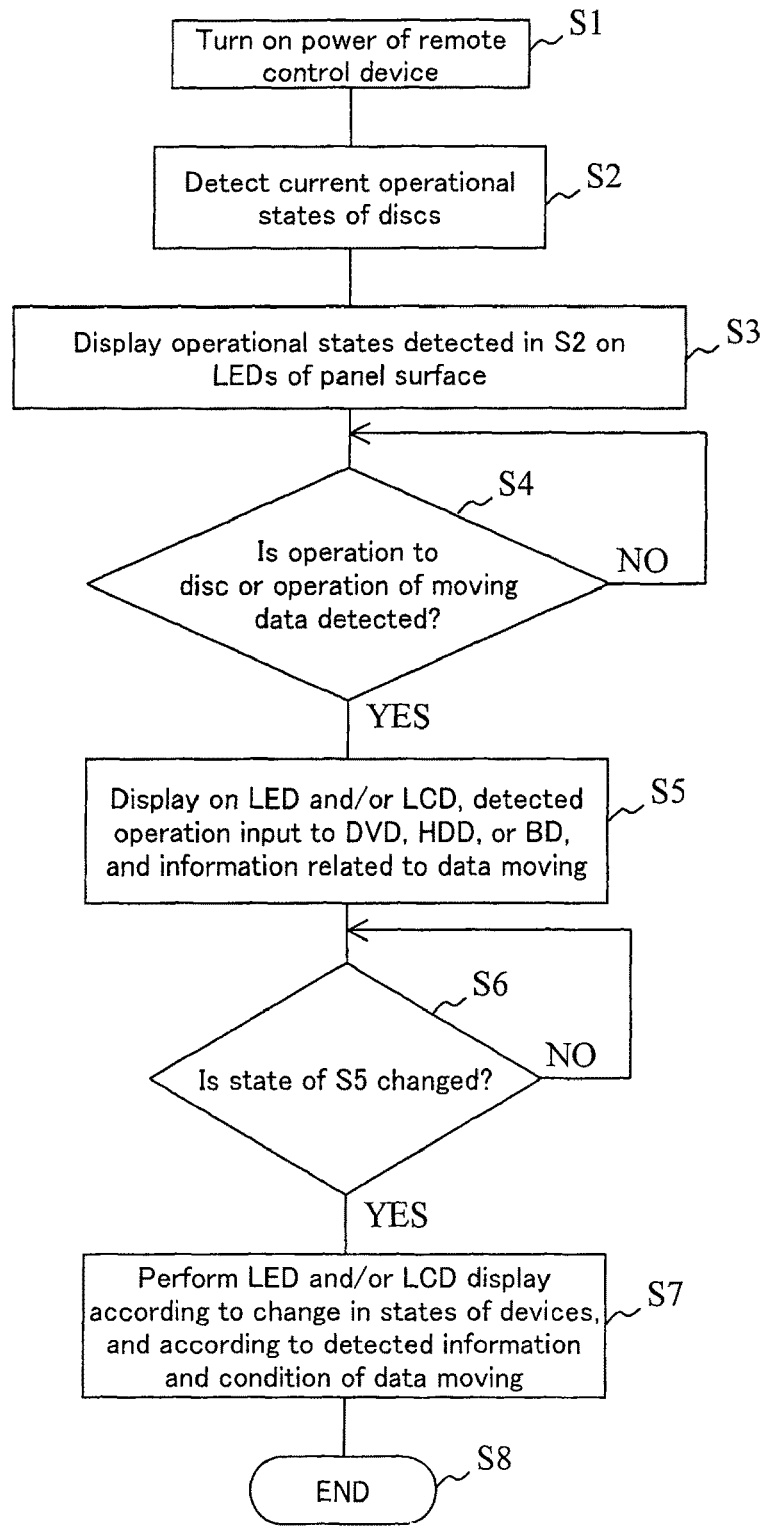
FIG. 8 is a flowchart of a process carried out in the recording/reproducing device, and is showing how display sections in a display unit formed on the front panel is controlled.
Figure 9:
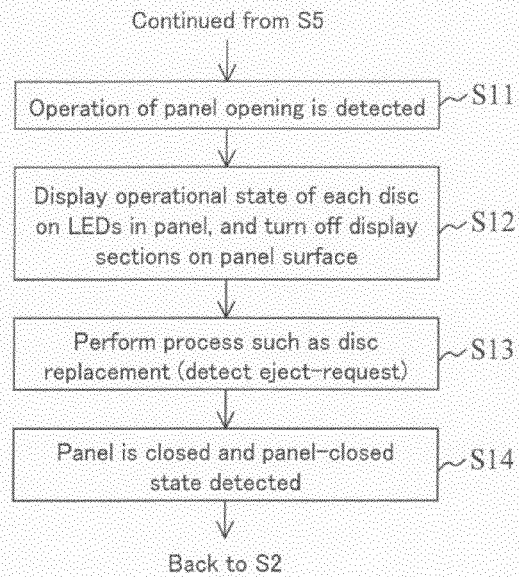
FIG. 9 is a flowchart of a processes carried out in the recording/reproducing device, and is showing how display sections in an inner-display unit formed on a surface which is exposed in the open-state of the front panel is controlled.

The following describes with reference to attached drawings a recording/reproducing device of the present embodiment. FIG. 1 is a perspective view of showing an exemplary exterior structure of the recording/reproducing device of the present embodiment with a movable panel being closed. FIG. 2 is a diagram corresponding to the perspective view of FIG. 1, and shows the recording/reproducing device with the movable panel being opened. FIG. 3(a) to FIG. 3(c) are respectively: a front view corresponding to FIG. 1; a front view corresponding to FIG. 2; and a top plan view showing a part of the recording/reproducing device shown in FIG. 2. FIG. 4 is a diagram showing an exemplary arrangement of disc devices in the recording/reproducing device of the present embodiment. FIG. 5 is a functional block diagram showing an example of internal structure of the recording/reproducing device of the present embodiment. FIG. 6 is a diagram showing an exemplary structure of programs which perform control process or the like in the recording/reproducing device of the present embodiment. FIG. 7 is a diagram showing an exemplary structure of a remote control device which enables a user to control the recording/reproducing device from a distance. FIG. 8 and FIG. 9 are flowchart showing how a display control process flows. FIG. 10 to FIG. 16 are diagrams respectively showing various examples of indication on display sections of the movable panel, in accordance with various operation states.

As shown in FIG. 1 to FIG. 4, the recording/reproducing device A of the present embodiment is a recording/reproducing device of so-called "dual-tray mode" having two storage medium insertion/ejection slots. This recording/reproducing device A includes: a DVD device 31 which is a first optical disc device (optical drive device); and a BD device 35 or the like which is a second optical disc device (optical drive device) in compliance with a different standard of storage capacity or the like from that of the DVD device 31. The DVD device 31 and the BD device 35 are arranged adjacent to each other.

The DVD device 31 is a disc drive device (disc drive) which reads data from a DVD, reproduces the data having been read, and writes data in a DVD. The BD device 35 is a disc drive device (disc drive) which reads data from a BD, reproduces the data having been read, and writes data in a BD.

The exterior of the recording/reproducing device A is designed to emphasize its slimness whether the device is laid horizontally or put upright, so that the exterior of the device fits the exterior of a flat-screen TV or the like when they are used together. As described later, while the recording/reproducing device A is laid horizontally, the DVD device 31 and the BD device 35 are arranged on left and right: i.e., in the horizontal direction (See FIG. 1 and FIG. 4). This allows reduction of the thickness of a casing 1 in the longitudinal direction as much as possible. Assuming that a flat-display TV such as a liquid crystal TV is used on an open rack, the thinness of the recording/reproducing device A is emphasized when the device is horizontally placed on the open rack.

The casing 1 shown in FIG. 1 for housing therein disc drive devices such as the DVD device 31 and the BD device 35 is formed by injection molding using a halogen-free flame retardant plastic (e.g. ABS polycarbonate resin). On the top surface of the casing 1, arranged is a thin top plate 1a with more tasteful finish than the other surfaces of the casing 1, which thereby creating luxurious and slim ambience of the casing 1 while maintaining its mechanical strength.

As shown in FIG. 4, when viewing from the front side of the recording/reproducing device A of the present embodiment in the case of horizontally laying the casing 1 in a typical manner, the DVD device 31 is arranged on the left side, the BD device 35 on the right, and a HDD device (hard disk device) 33 at a lower portion of the DVD device 31. Each of the DVD device 31 and the BD device 35 has a certain level of thickness. Thus, the thickness of the casing 1 can be reduced by: (I) arranging the DVD device 31 and the BD device 35 to be horizontally adjacent (parallel in the horizontal direction); and (II) arranging at the lower portion the HDD device 33 whose size and thickness can be reduced to further extent than those of the DVD device 31 and the BD device 35.

Further, a BD is treated with more microscopic processes than a DVD, and a higher accuracy of position is required between a pickup and the disc: that is, resistance against vibration is required. For this reason, the BD device 35 is arranged beside the HDD device 33 which can be a source of vibration, and the HDD device 33 is arranged below the DVD device 31. With this arrangement, an influence from vibration stemming from the HDD device 33 is reduced as much as possible.

Explaining this in further detail, the BD device 35, which requires a higher vibration resistance than a conventional DVD device, is arranged so that the BD device 35 is more distant from the HDD device 33 (i.e. possible vibration source) than the DVD device 31. Thus, an influence of vibration stemming from the HDD device 33 to the BD device 35 is restrained as much as possible.

The DVD device 31, the HDD device 33, and the BD device 35 are all capable of recording and reproducing data. However, for example, the DVD device 31 may a read-only device. A HDD device 33 generally has the largest storage capacity amongst the three devices 31, 33, and 35. A HDD device with as much as 600 GB is now in practical use. The storage capacity is smaller in the BD device 35 and further smaller in the DVD device 31. Therefore, the HDD device 33 is used as the basic storage device serving as a data server. The items of content stored in the HDD device 33 can be suitably sorted and written into a portable DVD or BD via the DVD device 31 or the BD device 35, considering various conditions such as: the state of use, the image quality, or the storage capacity to be used for the intended content. Thus, the content stored in the HDD device 33 can be semi permanently stored in a storage medium. By so doing, for example, the following becomes possible: reproducing the content stored in the storage medium by using another recording device; creating original content using the content in the medium and distribute the original content. Note that the HDD device 33 is a recording/reproducing device having no insertion/ejection slots.

In the following explanation, the DVD device 31, the HDD device 33, and the BD device 35 may be referred to as disc devices.

As shown in FIG. 1 and FIG. 3(a), the recording/reproducing device A of the present embodiment includes the casing (device main body) 1 having (i) the top plate 1a, and (ii) an openable-and-closable front panel (movable panel, openable-and-closable panel) 25a which is provided on a surface of the device, which surface comes to the front when the device is horizontally laid. On the left side and right sides of the front panel 25a, provided are: a power on/off switch 1b; an RC light-receiving section 17 for receiving an instruction from the remote control device of FIG. 7 in the form of an infrared ray; a panel-opening switch 25b for opening the front panel 25a; and a front panel locking structure 25 for locking the front panel 25a. Note that, an operation section for operating the reproducing/recording device is not provided on a plane of the front panel 25a, so that a false operation of the recording/reproducing device A is avoided even if a user unintentionally touches the surface of the front panel 25a.

The front panel 25a is usually locked by the front panel locking structure 25. The front panel 25a is pushed towards the open-direction when turning on the panel-opening switch 25b, or the panel-opening switch on the remote control device RC (tray opening/closing switches 75 and 77 of FIG. 7(b) also has this function). Further detailed explanation for the front panel locking structure 25 is omitted.

Once the front panel 25a is pushed, the weight of the front panel 25a causes the front panel 25a to make a turn-around movement in the open-direction until the inner angle of the front panel 25a with respect to the front surface of the casing 1 comes to 90°. The turnaround movement of the front panel 25a stops when the front surface of the casing and the front panel 25a becomes perpendicular to each other, as shown in FIG. 2. Note that, by unlocking the front panel 25a with a use of the remote control device, the front panel 25a can be opened by operating the remote control device.

As shown in FIG. 1, the front panel 25a is provided with a display unit (display section) 40. Here, it is assumed that the casing 1 is horizontally laid. The display unit 40 includes: a first display section 41; a third display section 43; and a second display section 47, each of which has substantially circular shape, and is arranged in the horizontal direction at a certain pitch. Specifically, the first display section 41, the third display section 43, and the second display section 47 are arranged in parallel along the horizontal direction. Each of the display sections is apart from the adjacent display section by a certain distance.

Assuming further that the reference direction is a direction from the DVD device 31 to the BD device 35, the first display section 41, the third display section 43, and the second display section 47 are sequentially arranged in this reference direction.

Furthermore, as shown in FIG. 1 and FIG. 2, the recording/reproducing device A includes: a DVD device (first recording/reproducing section, first device) 31 for performing recording and/or reproduction of data with respect to a removable DVD (first storage medium); a BD device (second recording/reproducing section, second device) 35 for performing recording and/or reproduction of data with respect to a removable BD (second storage medium); a first display section 41 for notifying a working state of the DVD device 31; and a second display section 47 for notifying a working state of the BD device 35. Here, in the recording/reproducing device A, a relative position of the DVD device 31 to the BD device 35 is the same as a relative position of the first display section 41 to the second display section 47.

Furthermore, as shown in FIG. 4 and FIG. 5, the recording/reproducing device A includes the HDD device (third device, third recording/reproducing section) 33 for performing recording and/or reproduction of data with respect to a hard disk which is a third storage medium. Furthermore, as shown in FIG. 1, the front panel 25a of the recording/reproducing device A is provided with the third display section 43 for notifying a working state of the entire recording/reproducing device A. This third display section 43 also has a function of notifying a working state of the HDD device 33. The third display section 43 is provided between the first display section 41 and the second display section 47, or in such a position that a user is able to see while the front panel 25a is closed. Furthermore, as described later, the third display section 43 notifies information including at least one of: (i) selected broadcast channel information of broadcast signals; (ii) external-input type information; (iii) external device information;

and (iv) information of type of communications with the external device, which are externally acquired by the reproducing/recording device A.

As shown in FIG. 2 and FIG. 3(b), when the front panel 25a is opened, a tray-front section (first insertion/ejection slot) 31a of the DVD device 31 mounted in the recording/reproducing device A, and a tray-front section (second insertion/ejection slot) 35a of the BD device 35 mounted in the recording/reproducing device A are exposed. These tray-front sections are on the front side of the casing 1, and face the front panel 25a when the front panel 25a is closed.

The tray-front section 31a is an inserting slot (insertion/ejection slot) from which a DVD is inserted (inserted/ejected) to/from the DVD device 31. The tray-front section 35a is an inserting slot (insertion/ejection slot) from which a BD is inserted (inserted/ejected) to/from the BD device 35.

Furthermore, on the surface having the tray-front sections 31a and 35a for placing thereon a disc, open/close switches 31b and 35b are provided respectively. These open/close switches 31b and 35b are respectively for ejecting or retracting the trays of the DVD device 31 and the BD device 35. By pressing the open/close switch 31b or 35b, the corresponding tray (hereinafter, disc mounting tray; not shown) of the disc device 31 or 35 for placing thereon a DVD or BD is ejected or retracted. This structure is more specifically explained below. As shown in FIG. 3(b), the open/close switch 31b for ejecting or retracting the disc mounting tray of the DVD device 31 is provided in the vicinity of the tray-front section 31a, and the open/close switch 35b for ejecting or retracting the disc mounting tray of the BD device 35 is provided in the vicinity of the tray-front section 35a. When the open/close switch 31b is pressed, the mounting tray (not shown) of the DVD device 31 is ejected or retracted, and when the open/close switch 35b is pressed, the disc mounting tray (not shown) of the BD device 35 is ejected or retracted.

For example, as shown in FIG. 2 and FIG. 3(b), an IEEE 1394 terminal (DV terminal) 15 and a B-CAS card slot 21a are provided below the region where the DVD device 31 and the BD device 35 are arranged. The B-CAS card is a card needed for receiving various broadcasting services such as Terrestrial Digital Television Broadcasting, BS Digital Broadcasting, 110 Degree CS Digital Broadcasting, or the like, and is also used for protecting copyrights for digitally broadcast programs or the like. For example, the B-CAS card needs to be inserted into the slot 21a, to use a broadcasting services such as: free digital broadcasting; pay-TV; pay-per-view broadcasting; NHK (Nippon Housou Kyoukai); a service of automatically displaying message; and a bidirectional service such as data broadcasting, or the like. Note that the reference numeral 21b indicates a push-button for ejecting the B-CAS card in the B-CAS card slot.

At a time of inserting the B-CAS card into the slot 21a while the front panel 25a is opened, if the card is not inserted up to the point where the card is properly locked, the edge of the B-CAS card may crash into the front panel 25a as the front panel 25a is closed. This may cause a damage to the B-CAS.

In view of that, the following measures 1) to 4) may be taken to prevent the B-CAS card from being damaged in the case where the B-CAS is not securely locked and is projected from the slot 21a by more than an allowable amount due to some kind of malfunction, but the user attempts to close the front panel 25a.

1) Giving a warning when a user tries to close the front panel 25a (notifying by means of displayed or vocal warning, or the like)

2) Restraining the turn-around movement of the front panel 25a so that the front panel 25 will not close when a user tries to close the front panel 25a if the B-CAS card is projected from the slot 21 by more than an allowable amount (even by a little more than the allowable amount)

3) Blinking a lamp or the like to notifying the user that the B-CAS card is not locked 4) Providing a mechanism by which the edge of the B-CAS card is pushed inward with user's pressing action in the back surface of the front panel 25a, so as to properly insert the B-CAS card into the slot 21 when the inserted B-CAS card is protruded from the slot 21a by more than an allowable amount.

Further, as shown in FIG. 3(b), an inner-display unit 48, which is similar to the display unit 40 but relatively smaller than the display unit 40, is provided between the IEEE1394 terminal (DV terminal) 15 and the B-CAS card slot 21a. This display unit 48 includes a fourth display section 48a, a sixth display section 48b, a fifth display section 48c, each arranged in the horizontal direction at a certain interval.

As shown in FIG. 3(b), the forth, sixth, and fifth display sections 48a, 48b, and 48c are provided in user-recognizable positions of the same surface as that of an attachment surface of the tray-front section (storage medium insertion/ejection section) 31a of the DVD device 31 and the tray-front section (storage medium insert/eject section) 35a of the BD device 35 which is exposed in an opened state of the front panel 25a. These display sections 48a, 48b, and 48c are different from the first display section 41, third display section 43, and the second display section 47, but they respectively indicate working states in association with the display sections 41, 43, and 47.

More specifically, the inner-display unit 48 includes: the fourth display section 48a, the sixth display section 48b, and the fifth display section 48c. Assuming that the casing 1 is horizontally laid, these display sections 48a, 48b, and 48c are arranged along the horizontal direction (transverse direction). Each of the display sections is arranged at a certain distance from the adjacent display section.

Furthermore, as shown in FIG. 3(b), the fourth display section 48a, the sixth display section 48b, and the fifth display section 48c are provided on the same surface where the tray-front section 31a of the DVD device 31 and the tray-front section 35a of the BD device 35 are provided. In other words, the fourth display section 48a, the sixth display section 48b, and the fifth display section 48c are recognizable by a user while the front panel 25a is opened.

Furthermore, as shown in FIG. 1 and FIG. 2, the fourth display section 48a, the sixth display section 48b, and the fifth display section 48c are arranged in parallel in this order, in a direction from the position of the DVD device 31 to the position of the BD device 35. The first display section 41, the third display section 43, and the second display section 47 are also arranged in parallel in this order.

In other words, where a reference direction is a direction from the position of the DVD device 31 to the position of the BD device 35, the first display section 41, the third display section 43, and the second display section 47 are arranged in this order along the reference direction, and are exposed on the casing 1 while the front panel 25a is opened (See FIG. 1). On the other hand, while the front panel 25a is closed, the fourth display section 48a, the sixth display section 48b, and the fifth display section 48c are arranged in this order along the reference direction, and are exposed on the casing 1 (See FIG. 2).

Furthermore, in the recording/reproducing device A, the fourth display section 48a corresponds to the first display section 41, and indicates the same information (i.e. working states of the DVD device 31) as that indicated on the first display section 41. The sixth display section 48*b* corresponds to the third display section 43, and indicates the same information (i.e. working states of the entire recording/reproducing device A) as that indicated on the third display section 43. The fifth display section 48*c* corresponds to the second display section 47, and indicates the same information (i.e. working states of the BD device 35) as that indicated on the second display section 47.

Thus, although the first display section 41, the third display section 43, and the second display section 47 are hidden while the front panel 25*a* is opened (See FIG. 1, and FIG. 3), a user of the recording/reproducing device A is able to confirm the same information indicated on these display sections, on the fourth display section 48*a*, the sixth display section 48*b*, and the fifth display section 48*c*.

With this structure, whether the front panel 25*a* is opened or closed, information indicating the working state of the DVD device 31, information indicating the working state of the BD device 35, and the information indicating the working state of the entire recording/reproducing device A are adjacently indicated in this order in the direction from the position of the DVD device 31 to the position of the BD device 35. Thus, in either case, the user is able to easily specify which piece of information is showing the working state of which device, based on the order in which the information items are indicated.

Note that the fourth display section 48*a*, the sixth display section 48*b*, and the fifth display section 48*c* are operation selecting keys also having indicating function. From the left side to the right of the figure, the fourth display section 48*a*, the sixth display section 48*b*, and the fifth display section 48*c* serve as operation state notifying means for notifying operation states of the DVD, HDD, and BD, respectively.

The DV terminal is typically an interface for (i) taking in video data from a DV camera to the HDD drive or the like, at a high speed; and (ii) inputting/outputting TS (Transport Stream) signals of Hi-vision broadcast content. This DV terminal is also provided at the back side of the recording/reproducing device A, and a user is able to suitably select which one of the DV terminals to use, based on the user's convenience.

Figure 3:
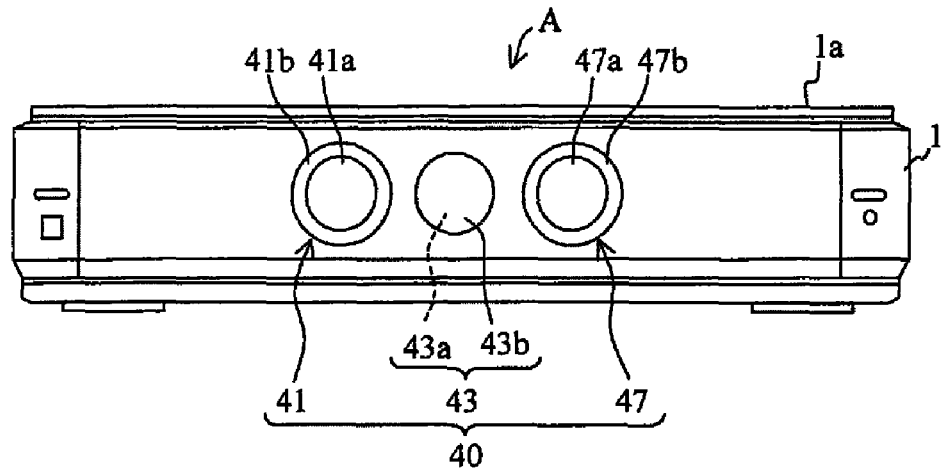
FIG. 3(*a*) is a front view of the recording/reproducing device corresponding to FIG. 1, and is showing the recording/reproducing device of FIG. 1 and FIG. 2.
Figure 3:
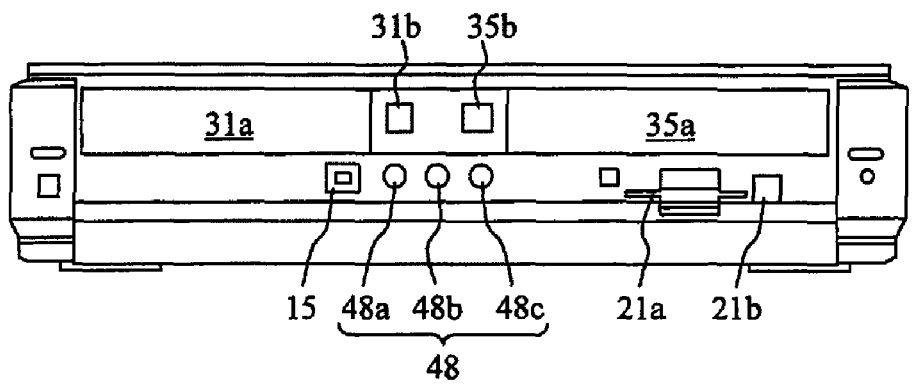
Figure 3:
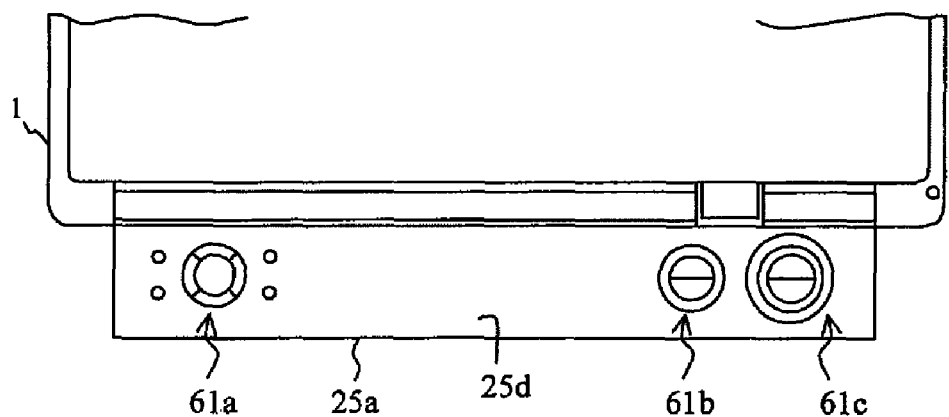

Further, as shown in FIG. 2 and FIG. 3(*c*), the back surface 25*b* of the front panel is provided with an operation section 61*a*, a reproduction-switch 61*b*, and a record-button 61*c*. For example, the operation section 61*a* includes: (i) direction keys which function as the direction keys on the remote control device RC of FIG. 7(*a*), and which are used in selecting a menu item from a plurality of menu items; and (ii) an enter button. The reproduction-switch 61*b* is a circular switch including semicircle switches for starting and stopping a reproduction, and an illuminating region around the periphery of the circle formed by the semicircular switches. The record-switch 61*c*, which is provided adjacent to the reproduction-switch 61*b*, has a similar shape to the reproduction-switch 61*b*. This record-switch 61*c* includes semicircular switches for starting and stopping a recording, and an illuminating region provided around the circle formed by these semicircular switches. The illumination colors of these illuminating regions are determined, on the basis of the operation states, as described later. Further, the direction keys and the selection keys of the operation section 61*a* are used, for example, for moving from a menu item to another menu item displayed on a menu screen, and for selecting a menu item.

As already mentioned, the recording/reproducing device A of a dual-tray mode includes: the DVD device 31 and the BD device 35 each having a disc drive, and the built-in type HDD device 33. Therefore, a delay caused by the starting time regarding the DVD or BD is remarkably reduced. For example, when a new DVD or BD is inserted in the DVD device 31 or the BD device 35, the recording/reproducing device A reads information of the disc placed in the disc device 31 or 35, and detects the type and the spec of the disc from the information having been read. In other words, the recording/reproducing device A is able to proceed to a subsequent process (actual reproduction or recording process) only after the recording/reproducing device A confirmed whether or not the disc inserted in the DVD device 31 or the BD device 35 can be subject to the subsequent operation. In the recording/reproducing device A of the dual-tray mode, two discs of two different standards are respectively inserted in disc devices (DVD device 31 and BD device 35) complying the matching standards. Then, disc information of is read from each of the discs in a parallel manner. Hence, the disc devices can be started in a short time.

In other words, in the dual-tray mode, it is possible to: (i) respectively insert a DVD and a BD in the DVD device 31 and the BD device 35; (ii) carry out, in a parallel manner, (a) a process of reading information from the DVD (the kind of disc, standards and the like) and (b) a process of reading information from the BD; and (iii) start the disc devices in a short time. On the contrary, in a mono-tray method which only has a single disc drive, the process of reading the disc information has to be carried out for each disc having been inserted, and it is impossible to read in a parallel manner the information from two kinds of discs.

Thus, the dual-tray mode is advantageous in that delay attributed to the process of reading the disc information at the time of insertion/ejection two discs is reduced by carrying out, in a parallel manner, the process of reading disc information with respect to the two discs.

Furthermore, in the recording/reproducing device A, the DVD device 31 and the BD device 35 are capable of so-called dubbing process, without involving the HDD device 35. The dubbing-process is data transition between two fixed discs in the reproduction side and the recording side, more specifically, the process of reproducing a content of one disc, while recording the content in real time onto the other disc. Thus, the HDD device 35 which is free during the dubbing process is able to carry out another process such as a process of recording a currently on-air program on the HDD device 35.

Next, an example of internal structure of the recording/reproducing device A of the present embodiment is described with reference to the block diagram of FIG. 5 showing the entire functional blocks, FIG. 6, and FIG. 7. As needed, FIG. 1 to FIG. 4 are also referred. As shown in FIG. 5, the recording/reproducing device A of the present embodiment includes: a CPU 3 for conducting overall control processes; and a functional block group which executes the later-described processes. As a block having the reproduction and recording functions, the DVD device 31, the HDD device 33, and the BD device 35 are provided, as hereinabove mentioned.

The disc device 31, 33, and 35 operates based on a control command given by the CPU 3 directly or via a disc drive control section 37. Actually, by operating a button of the remote control device RC of FIG. 7, or by operating an operating switches (operating section 61*a*, switches 61*b* or 61*c*) of the main-body side of the recording/reproducing device A, a signal corresponding to the operation is transmitted to the CPU 3. In a case of the remote control device RC, the recording/reproducing device A receives an infrared ray signal via the light-receiving section 17, and transmits the signal to the CPU 3. In accordance with the received signal, the CPU 3 outputs each block a command signal which instructs each block to work according to the operation of the buttons or switches.

For example, on the remote control device RC, when a CS-broadcast selecting button 70d in the broadcast selecting section 70 and a BD-selecting button 71c in the target device selecting section 71 are pressed (See FIG. 7), the content of a CS-broadcast program is recorded on a BD in the BD device 35. A BD is capable of storing a larger amount of data than a DVD. Therefore, for example, a CS-broadcast program of two to three hours or longer can be recorded with a high quality of image.

At the time of recording (e.g. at a time of recording a CS or BS digital broadcast), an image/sound signal processing section 5 having a recording encoder/decoder performs, for example, the following conversions: conversion of an image signal/audio signal of a CS-broadcast program into a format which is writable to a BD; and conversion of a signal recorded in the BD device 35 into a format for displaying on a display monitor. At this time, the image/sound signal processing section 5 sends the operation condition of the BD device 35 to the CPU 3, so that the CPU 3 is able to give proper instructions by monitoring as needed the operation condition of the disc devices.

The recording/reproducing device A of the present embodiment, in which each operation is controlled by the CPU 3, further includes: a ROM 7 for storing a program for causing the CPU 3 to execute the later-described processes; a RAM 11 for extracting the program data and running the program at a high speed; and an interface section 150. The interface section 150 inputs a broadcast signal received via an antenna, and outputs, to a display monitor such as a liquid crystal display TV, a signal of content or D video obtained at the time of driving a disc device (the DVD device 31, the BD device 35, or the like). Further, the interface section 150 is provided with, for example, an IEEE1394 terminal (DV terminal) 15 which connects to a DV camera, and/or a LAN terminal for connecting to the internet or the like. The interface section 150 controls inputs and/or outputs of various signals.

The recording/reproducing device A further includes: aforementioned RC light-receiving section 17; a B-CAS card slot drive section 21 for driving the B-CAS card slot 21a; a cooling fan 23 for raising heat dissipating effect; a front panel driving section 25c for (i) controlling opening/closing operation of the front panel 25a, and (ii) sensing, with a use of sensing section (not shown), whether the front panel is opened or closed; and an input section 61 for receiving various entry of operations.

Additionally, the recording/reproducing device A includes: a disc drive control section 37; and the display sections provided on the front panel 25a. The display sections are the first display section 41, the third display section 43, and the second display section 47 which are arranged at a certain interval in the horizontal direction, assuming that the casing 1 is horizontally laid. The display sections 41, 43, and 47 have a substantially a circular-shape, an ellipsoidal-shape, or a ring-shape. The shape of the display sections is symbolic of an optical disc and a hard disk. Furthermore, the indications on these display sections are controlled by the CPU 3, via the display control section 51.

Furthermore, the CPU 3 also controls, via the display control section 51, the indication on the fourth display section 48a, the sixth display section 48b, the fifth display section 48c each serving as an inner LED display section and also as a selection switch. Furthermore, the DVD device (drive) 31 and the BD device (drive) 35 are respectively provided with sensing sections 31c and 35c each for detecting the presence of a disc or sensing the driving state. Each of the sensing sections 31c and 35c transmits a signal regarding the presence of a media in the associated device 31 or 35 or a signal regarding the driving states of the associated device 31 or 35, to the CPU 3 via the disc drive control section 37. Note that FIG. 5 shows a position detection sensor (position sensing section) 27 which includes a gravity sensor or the like and which specifies the position (i.e., whether the device is laid horizontally or put upright) of the recording/reproducing device. This is explained in the later section describing an alternative form 4.

FIG. 6 shows an exemplary configuration of the program group stored in the ROM 7. The program group includes: a disc drive control program P1 for controlling driving of various discs (DVD, BD, HD); a display control program P2 for controlling display operation on the display sections; an interface control program P3 for controlling switching of interfaces in the interface section 15, and for performing signal conversion or the like; a panel/fan or the like control program P4 for controlling mechanical operations of the front panel 25a/fan 23 or the like; and an image/audio signal processing program P5 for performing signal processing including signal conversion with respect to an image signal/audio signal. The above listed programs are merely examples of the programs constituting the program group, and each of the programs, in cooperation with other programs, performs a series of control process.

Next described is how each of the above-mentioned functions works. First, structures of the display section and the display control section, and the display control based on the structures are described in detail.

As described before, the display unit 40 provided on the front panel 25a includes: the first display section 41, the third display section 43, and the second display section 47 which are substantially circular. In view of the casing 1 of the recording/reproducing device A horizontally laid, these display sections are adjacently arranged in a horizontal direction at a certain interval (See FIG. 3(a)).

Each of the first display section 41, the third display section 43, and the second display section 47 is a relatively large and easy-to-see display section whose diameter is approximately half the thickness of the recording/reproducing device A. With these display sections, it is possible to confirm the respective current operation states of the HDD device 33, the DVD device 31, the BD device 35 and the main body of the recording/reproducing device A, simply by checking the displays on the series of three circular display section (i.e. by checking whether or not each display section is lit, and in what color the display section is lit). It is further possible to easily confirm the relatively complicated working states regarding the direction of data transition amongst the disc devices 31, 33, and 35.

Furthermore, the first display section 41 is provided, on its backside, with three kinds of LEDs (not shown), so that the first display section 41 is able to emit light of three colors; e.g., R (Red), B (Blue), and W (White). Further, the first display section 41 is provided, on its front side, with: a semi-transparent plate or a light-shielding plate 41a and a light transmitting section 41b. The semi-transparent plate or the light-shielding plate 41a blocks the light from the LEDs, and has thereon a later-mentioned DVD logo. The light transmitting section 41b is provided in a ring manner around the light-shielding plate 41a, and transmits light from the LEDs to the front side (See FIG. 3(a), FIG. 11 to FIG. 14 or the like). This light transmitting section 41b is made of a transparent plastic plate or the like.

With the logo on the display section 41, the user knows that the display section 41 corresponds to the DVD device 31. Further, with the color of emitted light from the light transmitting section 41b, the user can grasp the working state of the DVD device 31.

Note that, the first display section 41, the third display section 43, and the second display section 47, notify to the user the working state of the entire recording/reproducing device A, or the respective working states of the HDD device 33, the DVD device 31, and the BD device 35. In addition to indications by different colors, the working state may be notified in the form of distinction display including color indication, characters, or the like. In particular, the third display section 43 is provided with an LED and an LCD, so that information of more complicated operations can be notified.

As in the first display section 41, the second display section 47 is provided, on its backside, with three kinds of LEDs, so that the second display section 47 is able to emit light of three colors; e.g., R (Red), B (Blue), and G (Green). Further, the second display section 47 is provided, on its front side, with: a semi-transparent plate or a light-shielding plate 47a; and a light transmitting section 47b. The semi-transparent plate or the light-shielding plate 47a blocks the light from the LEDs (not shown), and has thereon a later-mentioned BD logo. The light-transmitting section 47b is provided in a ring manner around the light-shielding plate 47a, and transmits light from the LEDs to the front side (See FIG. 3(a), FIG. 11 to FIG. 14 or the like). This light transmitting section 47b is made of a transparent plastic plate or the like.

With the logo on the display section 47, the user knows that the display section 47 corresponds to the BD device 35. Further, with the color of emitted light from the light transmitting section 47b, the user can grasp the working state of the BD device 35.

As shown in FIG. 3(a), between the first display section 41 and the second display section 47, the third display section 43 is formed away from the first and the second display sections 41 and 47 by a certain distance. This third display section 43 includes: a reflection plate (not shown); an LED 43a serving as a light source; and a circular liquid crystal panel 43b provided opposite the LED 43a. The reflection plate, the LED 43a, and the liquid crystal panel 43b are sequentially provided in this order from the back surface side to the front surface side (See FIG. 3(a)). The LED 43a is preferably a plane light source having an edge light and an optical waveguide.

This third display section 43 is designed suggestive of the disc of the HDD device 33, and is configured so that text is shown on the liquid crystal panel 43b when the LED 43a is lit.

In short, the third display section 43 includes an LCD capable of displaying text.

Thus, the display sections 41, 43, and 47 are such that each display section has a disc-like shape, and has a size which is close to the height of the front panel 25a. By so designing each of the display sections, a user is able to discriminate the display sections from each other from a distance. Further, the shape of each display sections is suggestive of a disc, and with the logos the user can easily picture the vision of DVD or BD.

Furthermore, the first display section 41, the third display section 43, and the second display section 47 are arranged adjacent to each other, but are separated from each other. In other words, each of the first display section 41, the third display section 43, and the second display section 47 are separate display sections but they are close to each other.

In this way, the operation state of each disc device is separately indicated on the corresponding display section. This allows explicit indication of operation states of the disc devices and conditions of data exchanging between discs. With the present embodiment, the following advantages are obtained. Namely, it is remarkably easier to visually understand the operation state of each disc device and data exchanging process carried out, as compared to a case of a typical recording/reproducing device having only one display section to present the same information in the form of text data or the like. Thus, a user is able to viscerally and promptly grasp the conditions of the recording/reproducing device, even if the user is far from the device by a distance at which users in general operate the recording/reproducing device. Amongst the first display section 41, the third display section 43, and the second display section 47, a small lighting section is provided on a side of the first display section 41. This lighting section indicates that a record-command has been given.

Further, as shown in FIG. 3(c), while the front panel 25a is opened, one of the disc devices (the DVD device 31, HDD device 33, or BD device 35) is selected with a use of the selection switches (which also serve as the fourth, sixth, and fifth display sections 48a, 48b, and 48c). Then, by pressing the reproduction-switch 61b or the record-button 61c, the selected disc device enters the reproduction-mode or the record-mode. At this point, the ring-shape illuminating region (aperture region) formed around the outside the reproduction-switch 61b or the record-button 61c, emits light of a color corresponding to the operation conditions. This allows the user to know the operation state of the disc device (the DVD device 31, the HDD device 33, or the BD device 35), even while the front panel 25a is opened. For example, the ring-shape illuminating region (aperture section) around the periphery of the reproduction-switch 61b emits blue light indicating that a reproduction is in process, while the ring-shape illuminating region (aperture region) around the periphery of the record-button 61c emits orange or red light indicating that a recording is in process.

In the present embodiment, different light sources are respectively used for emitting light from the display unit 40 on the front panel 25a, and from the inner-display unit 48 exposed while the front panel 25a is opened. However, for example, a display section provided on the front panel 25a and a display section exposed when the front panel 25a is opened can be respectively arranged in positions substantially opposite to each other. For example, it is possible to provide the first display section 41 of the display unit 40 on the surface of the front panel 25a, and provide the fourth display section 48a of the inner-display unit 48 on the back surface of the front panel 25a so that the fourth display section 48a is on the opposite side of the first display section 41. In this arrangement, the first display section 41 and the fourth display section 48a are able to share a common light source to emit light. This is advantageous in that the number of parts of light emitting elements is reduced, structure is simplified, and that the power consumption is reduced.

In the following, a recording characteristics (dubbing direction) of a mono-tray mode and that of a dual-tray mode are compared.

Firstly, in the case of a mono-tray mode, a dubbing process is possible in two directions between HDD and DVD, and between HDD and BD. Thus, there are 4 possible routes for moving data. On the other hand, in a dual-tray mode, the dubbing process is possible in total of 6 directions: i.e., 2 directions each between HDD and DVD, between HDD and BD, and between DVD and BD. Thus, the dual-tray mode is highly convenient. Furthermore, the dual-tray mode realizes even more convenient feature that an optical disc can be inserted or ejected into/from one disc device while another optical disc is being accessed. Further, the dual-tray mode allows not only a DVD-BD dubbing process, but also simultaneous recording of content on both DVD and BD. For example, while video data in the HD is recorded on a DVD with an SD (Standard Definition) image via a down converter, the same program (needs only 1 tuner) or a different program (needs two tuners) can be recorded also in a BD as an HD (High Definition) image. Thus, a time taken for processing can be reduced. It is also possible to record the program on the HDD at the same time.

In a case where two tuners are provided, it is possible to perform follow-up replay between a DVD and HDD while a video is being recorded on a BD. Here, the "follow-up replay" is a process in which a video is reproduced from the beginning while the video is recorded or dubbed.

For example, By performing follow-up replay while dubbing process, for example, content of BD is reproduced and displayed while the same content is being recorded on a DVD. It is also possible to perform the follow-up replay of content in a DVD, while the content is being dubbed from the DVD to a BD.

It is further possible to reproduce the video recorded on a BD, while a broadcast program of a channel selected by a tuner is recorded on a DVD.

As described, the recording/reproducing device of the present embodiment is capable of performing more complicated operations than a conventional recording/reproducing device. This capability however makes it difficult to grasp the operation states. For this reason, it is preferable to perform the above described indication.

Next, by mainly referring FIG. 1, FIG. 5 and FIG. 8 through FIG. 16, the following describes in detail the display control of the display unit 40 on the front panel 25a. Further, in the following explanations, all the drawings are referred in regard to the reference numerals. First described is a basic display control method. Basically, the first display section 41, the third display section 43, and the second display section 47 of the display unit 40 indicates three colors of white, blue, and red.

For example, white color means that a disc device which is currently operable, and is not a disc device which is in process of performing reproduction or recording (i.e. disc device in use). In short, the white color is indicated when a medium is in the DVD device 31 or the BD device 35. More specifically, when a medium is in the DVD device 31, the first display section 41 illuminates in white, and when a medium is in the BD device 35, the second display section 47 illuminates in white. Since the white color is suggestive of a state where nothing is being carried out, the color is suitable for notifying the user that neither reproduction or recording is being performed.

Furthermore, for example, light of a blue color from a blue LED means that the content of a disc is being reproduced, and light of a red color from a red LED means that content is being written in (recorded on) a disc. That is, the first display section 41 illuminates in blue while the DVD device 31 is performing a reproduction, the third display section 43 illuminates in blue color while the HDD device 33 is performing a reproduction, and the second display section 47 illuminates in blue while the BD device 35 is performing a reproduction. Likewise, the first display section 41 illuminates in red while the DVD device 31 is performing a recording, the third display section 43 illuminates in red while the HDD device 33 is performing a recording, and the second display section 47 illuminates in red while the BD device 35 is performing a recording.

Thus, even if there is a certain distance between the user and the recording/reproducing device A, the user is able to clearly recognize the operation condition of the disc. Note that the indication by colors is mere an example, and other kinds of indication are also possible as long as it is visibly distinguishable by the user.

Meanwhile, the display section 43 is lighted in line with a basic principle determined based on the following order of priority. 1) While the HDD device 33 is operating (i.e. while a recording or reproduction is performed), the liquid crystal panel 43b of the third display section 43 indicates the operation condition or the like information of the HDD device 33. Basically, for the purpose of displaying the state of the HDD device 33 which plays a main role in recording or reproduction in the recording/reproducing device A of the present embodiment, the third display section 43 is also capable of displaying text on the liquid crystal panel 43b, in addition to the function of performing color indication. Thus, the third display section 43 is more multifunctional than the first and second display sections 41 and 47.

2) While the HDD device 33 is not operated, the liquid crystal panel 43b of the third display section 43 displays, in the form of text information, the operation condition (reproduction or recording) or the like of the DVD device 31 and/or the BD device 35 being in operation.

3) While a reproduction and a recording are performed at the same time, the liquid crystal panel 43b of the third display section 43 preferentially displays the information of the reproduction.

Next, the following describes the display control of the display sections of the recording/reproducing device of the present embodiment, mainly with reference to the flowchart of FIG. 8 and FIG. 9 as well as the other figures.

Firstly, in Step 1 (hereinafter, S1) of FIG. 8, when a power source switch of the remote control device RC is turned on, the CPU 3 receives a power-on instruction from the remote control device RC, via the RC light-receiving section 17, and then actually turns on the power of the recording/reproducing device A. FIG. 16(a) shows an exemplary displaying on the display section during this state.

As shown below, the label reading "1 POWER-ON" of FIG. 16(a), the light transmitting section 41b of the first display section 41 for the DVD device 31 blinks in white by using white light from a white LED. Further, the second display section 47 for the BD device 35 also blinks in white by using white light. Here, the HDD device 33 always has a disc which is a randomly accessible writable/readable medium, and as such the third display section 43 for the HDD device 33 displays and scrolls only once a string of text for notifying that the recording/reproducing device A is started (e.g. "Hello"), while white light is emitted in response to an operation of turning on the power.

Figure 10:
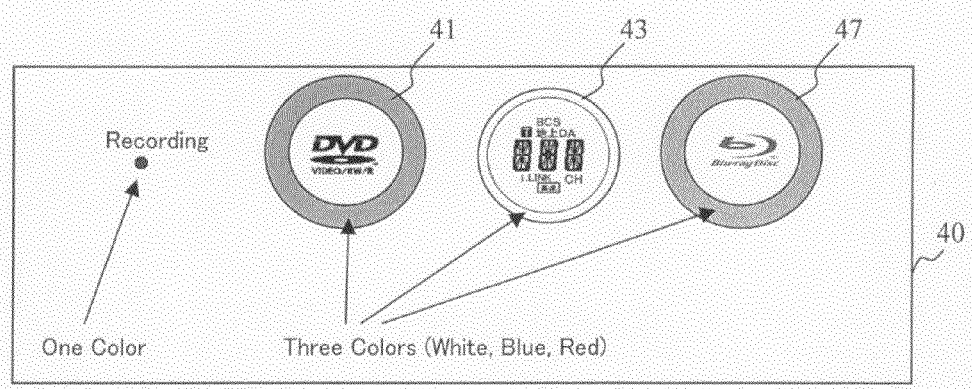
FIG. 10 is a pattern diagram of each display section on the front panel, and is showing examples of displaying according to operation conditions of the recording/reproducing devices.

As shown in FIG. 10, in the text displaying on the LCD, the number of letters displayed is limited to three at the most for the purpose of displaying each letter in a large size, and the text is scrolled at a relatively low speed (e.g. approximately 2 Hz). This point is described more specifically with reference to FIG. 15. The third display section 43 displays and scrolls text to be displayed in such a manner that, amongst the letters in the string of text, the number of the letters in the text to be simultaneously displayed is limited to 3 at the most, so that the string of text scrolled is displayed in a largest possible size. Since text is displayed and scrolled in a large size and at a low speed, a user is easily able to recognize a string of text such as "HELLO" and "COPY" or the like.

Next, in S2 of FIG. 8, the CPU 3 acquires the respective current states of the disc devices (DVD device 31, HDD device 33, and BD device 35) from the sensing sections 31c, 33c, and 35c, via the disc drive control section 37. The CPU 3 also detects, for example, the presence of a broadcast signal.

If no disc is in a disc device, the absence of the disc is detected, and the lighting of the corresponding display section turns off. If the CPU 3 acknowledges that a disc device has therein a supported disc which is readable and writable (i.e. when a process of reading in the DVD or BD is completed), a command is sent from the CPU 3 to a corresponding display section via the display control section 51, so as to cause the display section to switch its displaying from blinking in white to the turned-off state.

Here, if a broadcast TV program is being received via the interface section 15, the third display section 43 for the HDD device 33 displays and blinks thereon text indicating the channel of the program (BS103 CH in FIG. 16), by using the white LED back light. For example, the user is able to know based on the displaying which program is currently in the standby mode for reception.

Next, after the process of reading in the disc and the process of selecting a program to be received is completed, displaying based on the information detected in S2 is performed in S3. In other words, when the process of reading in the disc information is completed in the DVD device 31 and the BD device 35, the first and the second display sections 41 and 47 switches from the blinking in white to the turned-off state (See FIG. 16). When the HDD device 33 finishes its preparation, the channel of the program is determined (BS103CH), and the text information indicating this channel is displayed with the LED backlight being turned on in white color. Therefore, the user is able to know that the disc devices are all in the standby mode.

Next, in S4, CPU 3 performs periodically or constantly carries out a process of detecting whether or not a new operation or an operation for moving data or the like is carried out with respect to each disc device. When a new operation is detected, the CPU 3 proceeds to S5, and the CPU 3 performs detection of an input of operation to the DVD, HDD, or BD (i.e. detection of the respective states of the disc devices), and causes the display unit 40 to perform a new displaying based on the information regarding the moving of data.

Furthermore, the CPU 3 detects if there is a new change in the state of S5 (i.e., a change in each of the states of the disc devices). If there is a change (Yes in S6), the CPU 3 proceed to S7. In S7, the CPU 3 causes the display sections 41, 43, and 45 to perform, according to the above mentioned displaying principles and the order of priority, an LED displaying or an LCD displaying to present the operation conditions and the state of moving data or the like, based on the information (the state of each device having changed) having been detected. Then, the CPU 3 ends the process (S8).

The process of controlling the displaying is more specifically described in further detail with reference to FIG. 11 to FIG. 15.

Displaying Example 1) of FIG. 11 is an exemplary displaying during an HDD mode (when the power is turned ON). In this example, the third display section 43 illuminates in white, and indicates that a program on BS 103 channel (CH) is input via the interface section 15.

Displaying Example 2) of FIG. 11 is an exemplary displaying during a DVD mode (when the power is turned ON). Here, in addition to the Displaying Example 1), the first displaying section 41 corresponding to the DVD device 31 is also lit in white, indicating that the DVD device 31 is usable.

Displaying Example 3) of FIG. 11 is an exemplary displaying during a BD mode (when the power is turned ON). Here, in addition to the Displaying Example 1), the second displaying section 47 corresponding to the BD device 35 is also lit in white, indicating that the BD device 35 is usable.

Thus, when the power is turned on, it is possible to inform a user of a usable disc device amongst the DVD device 31, HDD device 33, and BD device 35. Note that, the HDD device 33 is always usable when the power is turned on. Therefore, in all the cases of Displaying Examples 1) through 3) of FIG. 11, the third display section 43 illuminates in white indicating that the third display section 43 is usable.

Displaying Examples 4) and 5) of FIG. 11 respectively show examples of displaying during a recording by the HDD device 33, and during a reproduction by the HDD device 33. In Displaying Example 4), the third display section 43 illuminates in red, and the name of the received channel is displayed on the third display section 43. In Displaying Example 5), the third display section 43 illuminates in blue, and text reading "PLA" is displayed on the third display section 43 to indicate that the content of the HDD device 33 is being reproduced.

Displaying Examples 1) and 2) of FIG. 12 respectively show examples of displaying during a recording by the DVD device 31, and during a reproduction by the DVD device 31. During the recording, the first display section 41 illuminates in red. During the reproduction, the first display section 41 illuminates in blue. In the former case, the third display section 43 displays the "BS 103 channel (CH)" as the information of the DVD device 31 in operation. In the latter case, the third display section 43 displays 3 letters reading "Play", as the information of the DVD device 31 in operation.

Displaying Examples 3) and 4) of FIG. 12 respectively show examples of displaying during a recording by the BD device 35, and during a reproduction by the BD device 35. During the recording, the second display section 47 illuminates in red. During the reproduction, the second display section 47 illuminates in blue. The displaying on the third display section 43 in these cases is the same as the Displaying Example 1) and Displaying Example 2), respectively. Note that the record-display section a illuminates in red, in Displaying Example 4) of FIG. 11, and in Displaying Examples 1) and 3) of FIG. 12, so as to separately notify that the recording is in process.

Displaying Example 5) of FIG. 12 shows an exemplary displaying during an HDD-recording-and-reproduction. In this example, the third display section 43 illuminates in blue, and the HDD device 33 is reproducing its content. Further, the record-display section α illuminates in red, so as to indicate that the HDD device 33 is reproducing its content while recording thereon a program on the BS103 CH at the same time.

As described, with the provision of the record-display section α in combination with the other display sections, it is possible to indicate a complicated operation condition which could not be indicated by a single display section. Note that the following is possible in place of the record-display section α. Namely, for example, each of the circular (ring-shaped) display sections 41, 43, and 45 may be divided in two, so that the display sections 41, 43, and 45 is able to simultaneously display blue and red colors.

Displaying Example 1) of FIG. 13 shows an exemplary displaying during an HDD-recording operation, and a DVD-reproduction. In this example, the third display section 43 illuminates in red, indicating that a broadcast program on the channel (BS103CH) displayed in the form of text is being recorded on the HDD device 33, while the first display section 41 illuminates in blue, indicating that the content of the DVD is being reproduced by the DVD device 31. In sum, in this example, the first display section 41 illuminates in blue to indicate that the content of DVD is being reproduced, and the record-display section α illuminates in red so as to indicate that a recording with respect to the HDD is performed at the same time the reproduction of the DVD is performed.

Displaying Example 2) of FIG. 13 shows an exemplary displaying during an HDD-recording operation, and a BD-reproduction. In this example, the third display section 43 illuminates in red indicating that a broadcast program on the channel (BS103CH) displayed in the form of text is being recorded on the HDD device 33, while the second display section 47 illuminates in blue, indicating that the content of the BD is being reproduced by the BD device 35. In sum, in this example, the second display section 47 illuminates in blue to indicate that the content of the BD is being reproduced, and the record-display section α illuminates in red so as to indicate that a recording with respect to the HDD is performed at the same time the reproduction of the BD is performed.

Displaying Example 3) of FIG. 13 shows an exemplary displaying during a DVD-recording operation and an HDD-reproduction. In this example, the first display section 41 illuminates in red, indicating that the DVD device 31 is in process of a recording. Meanwhile, the third display section 43 illuminates in blue and displays and scrolls text reading "PLAY" to indicate that the content of the HDD device 33 is being reproduced. In this case, the text displayed as the operation condition of the HDD device 33 during the operation of the HDD device 33 is "PLAY", and not "COPY" or "MOVE". Thus, a user is able to recognize that so-called "dubbing" process is not performed, and that the HDD device 33 and the DVD device 31 are respectively performing a reproduction and a recording independently from each other.

Displaying Example 4) of FIG. 13 is an exemplary displaying example during a DVD-recording and a BD-reproduction. The first display section 41 illuminates in red to indicate that the DVD device 31 is performing a recording, while the second display section 47 illuminates in blue to indicate that the BD device 35 is performing a reproduction. Furthermore, the third display section 43 illuminates in white to indicate that the HDD device 33 is in the standby mode, and not in the operation mode. Further, three letters "PLA" of the word "PLAY" is displayed and scrolled on the third display section 43, so that the user is able to recognize that it is the BD device 35 which is performing the reproduction (i.e., in "PLAY" mode), and not the HDD device 33.

Displaying Example 5) of FIG. 13 is an exemplary displaying during a BD-recording operation, and an HDD-reproduction. In this example, the third display section 43 illuminates in blue and scrolls text reading "PLAY", to indicate that the HDD device 33 is performing a reproduction. Furthermore, the third display section illuminates in red, indicating that the BD device 35 is performing a recording. In this case, the text displayed as the operation states of the HDD device 33 during the operation of the HDD device 33 is "PLAY", and not "COPY" or "MOVE". Thus, a user is able to recognize that so-called "dubbing" process is not performed, and that the HDD device 33 and the BD device 35 are respectively performing a reproduction and a recording independently from each other.

Displaying Example 6) of FIG. 13 shows an exemplary displaying during a BD-recording operation and a DVD-reproduction. The first display section 41 illuminates in blue to indicate that the DVD device 31 is performing a reproduction, while the second display section 47 illuminates in red to indicate that the BD device 35 is performing a recording. Here, the third display section 43 illuminates in white, and displays and scrolls the three letters "PLA" in the text reading "PLAY". Thus, the user is able to recognize that the it is the DVD device 31 which is performing the reproduction (i.e. in the "PLAY" mode), and not the HDD device 33. Further, the user is able to know that so-called "dubbing" process is not performed, and that the DVD device 31 and the BD device 35 are respectively performing a reproduction and a recording independently from each other.

Displaying Example 7) of FIG. 13 shows an exemplary displaying during a dubbing process from the HDD to a DVD. In this case, the first display section 41 illuminates in red, and the DVD device 31 is performing a recording. The third display section 43 illuminates in blue, and the HDD device 33 is performing a reproduction. Furthermore, the text reading "COPY" is scrolled on the third display section. Thus, the user is able to recognize that a dubbing process from the HDD to DVD is performed.

Displaying Example 8) of FIG. 13 is an exemplary displaying during a (high-speed) dubbing process from the HDD to a BD. In this example, the third display section 43 illuminates in blue. Further, on the third display section 43, a letters reading "high-speed" is displayed to indicate that a high-speed dubbing process is performed, and the letters reading "BS103" is also displayed at the lower portion to indicate the channel of a program currently output to a display device (not shown). Furthermore, the second display section 47 illuminates in red. Therefore, the displaying is performed in such a manner that the user is able to know that the (high-speed) dubbing process from the HDD to the BD is performed.

Displaying Example 9) of FIG. 13 is an exemplary displaying during a (constant-speed) dubbing process from the HDD to a BD. In this example, third display section 43 illuminates in blue, and text reading "COPY" is displayed and scrolled on the third display section 43. Since the second display section 47 illuminates in red, the displaying is such that the user is able to know that a (constant-speed) dubbing process is performed from the HDD to the BD. Note that the text reading "high-speed" is displayed during a high-speed dubbing process, but no such characters are displayed during a constant-speed dubbing process, so that the user is able to know the speed at which the dubbing process is performed.

Display Example 10) of FIG. 13 is an exemplary displaying during a (constant-speed) dubbing process from the HDD to a device which is connected via an IEEE1394 terminal. The third display section 43 illuminates in blue, and text reading "i-link" is displayed and scrolled on the third display section 43. Furthermore, the lighting of the first display section 41 and the second display section 47 are turned off. Thus, the displaying is performed in such a manner that the user is able to know that a (constant-speed) dubbing process is performed from the HDD device 33 to a device connected via the IEEE 1394 terminal.

Displaying Example 1) of FIG. 14 shows an exemplary displaying during a (constant-speed) dubbing process from a DVD to the HDD. The first display section 41 illuminates in blue, and the third display section 43 illuminates in red. Furthermore, the text reading "COPY" is displayed and scrolled on the third display section 43. Thus, the displaying is performed in such a manner that the user is able to know that a (constant-speed) dubbing process is performed from the DVD to the HDD.

In other words, the user is able to recognize, by referring to the first display section 41 and the second display section 47, that the DVD device 31 and the HDD device 33 are operated. Further, by the displaying of text reading "COPY" on the third display section 43, the user is able to further recognize that the DVD device 31 and the HDD device 33 are in a state of joint operation to perform a dubbing process.

Displaying Example 2) of FIG. 14 shows an exemplary displaying during a (constant-speed) dubbing process from a DVD to a BD. The first display section 41 illuminates in blue, and the third display section 43 illuminates in white. Further, text reading "COPY" is displayed and scrolled on the third display section 43. Further, the second display section 47 illuminates in red. Thus, the displaying is performed in such a manner that the user is able to know that a (constant-speed) dubbing process is performed from the DVD to the BD.

Displaying Example 3) of FIG. 14 shows an exemplary displaying during a (high-speed) dubbing process from a BD to the HDD. The third display section 43 illuminates in red, and displays and scrolls text reading "High-speed", so as to indicate that the dubbing process is performed at a high-speed. Furthermore, the third display section 43 displays text reading "BS103" which is the channel of a program currently output to a display device (not shown). Furthermore, since the second display section 47 illuminates in blue, the user is able to know that a (High-speed) dubbing process is performed from the BD to HDD.

Displaying Example 4) of FIG. 14 shows an exemplary displaying that a (constant-speed) dubbing process from a BD to the HDD. In this example, third display section 43 illuminates in red, and characters reading "COPY" is displayed and scrolled on the third display section 43. Further, the second display section 47 illuminates in red. Thus, the displaying is performed in such a manner that the user is able to know that a (constant-speed) dubbing process is performed from the BD to the HDD.

Displaying Example 5) of FIG. 14 shows an exemplary displaying during a (constant-speed) dubbing process from a BD to a DVD. The first display section 41 illuminates in red, and the third display section 43 illuminates in white. Further, text reading "COPY" is displayed and scrolled on the third display section 43. Further, the second display section 47 illuminates in blue. Thus, the displaying is performed in such a manner that the user is able to know that a (constant-speed) dubbing process is performed from the BD to the DVD.

Displaying Example 6) of FIG. 14 shows an exemplary displaying during a time-shift playing. The third display section 43 illuminates in blue, and displays the channel of content being time-shifted. The first and third display sections 41 and 47 are turned off. Thus, the user is able to know that the time-shift playing is performed.

Note that the time-shift playing is to record en bloc the currently-output program on the hard disk, so that the viewer is able to pause the program, or to go back and review the program.

Displaying Example 7) of FIG. 14 shows an exemplary displaying during the follow-up replay. The third display section 43 illuminates in blue. The channel of a program being subjected to the follow-up replay is displayed in the form of text on the third display section 43. During the follow-up replay, the red lamp of the record-display section α is lit to notify a user that it is not time-shift playing which is being performed. In this case, the light of the first and third display sections 41 and 47 are turned off, so as to notify that the follow-up replay (time-shift playing) is performed.

FIG. 15 shows examples of text indicated (on a liquid crystal display) on the third display section 43. See FIG. 15(a) for the following explanations. (1) While a tuner is receiving a broadcast, the type of broadcasting (BS broadcasting in this case) received by the tuner, and the channel (103CH in this case) of the broadcasting are displayed. (2) During an external-AV-input, for example, "L1" is displayed. (3) During DV (IEEE1394)-input, text reading "DV" is displayed. (4) During iLINK (TS) mode, the displaying is performed to indicate the mode. Note that, the IEEE1394 standard defines two kinds of signals: i.e., a DV signal and a TS signal, which respectively represent data of different formats. The DV signal and TS signal both share common input and output terminals.

See FIG. 15(b) for the following explanations. (1) During a dubbing (copy) process, the first to third letters of text reading "COPY" are scrolled and displayed. (2) During a dubbing (moving) process, the first to third letters of text reading "MOVE" are scrolled and displayed. (3) During a play process, the first to third letters of text reading "PLAY" are scrolled and displayed. (4) while downloading data from satellite, the backlight is turned off, and text reading "DL" is displayed. (5) During B-CAS communications, the backlight is turned off, and text reading "CAS" is displayed. (6) During a process of acquiring terrestrial digital EPG, the backlight is turned off, and text reading "EPG" is displayed. (7) While a program table is displayed, the backlight is turned on, and text reading "EPG" is displayed.

The examples shown in FIG. 15 are not more than just examples. With the colors of the first display section 41, the third display section 43, and the second display section 47, and the text displaying on the second display section 47, a user is able to recognize: the respective operation conditions of the DVD device 31, HDD device 33, and BD device 35; direction of moving data amongst the devices; and the operation condition of the recording/reproducing device A.

FIG. 9 is a flowchart of steps carried out in a case of detecting an operation of opening the front panel 25a. In S5 of FIG. 8, if the CPU 3 detects an operation of opening the front panel 25a (S11), the respective operation states of the disc devices are indicated by the display sections 41, 43, and 47 on the front panel 25a (S12). At this point, the LEDs of the display sections 41, 43, and 47 on the front panel 25a are turned off.

Subsequently, disc replacement or the like is performed in S13. Here, the S12 is executed after detecting an operation of the "open"-key for the front panel 25a or "Eject"-key in S4. Then, after detecting that the front panel 25a is opened, the tray is ejected. After that, a disc is placed on the tray, and is inserted in the disc device. When an operation of closing the front panel 25a is detected in S14, the CPU proceed to S2 of FIG. 8.

As described, a recording/reproducing device of the present embodiment includes three disc devices, and a series of three display sections which are arranged on a front panel of the recording/reproducing device in the same order as the three disc devices. These display sections are capable of indicating operation conditions of the disc devices and a data moving condition, by performing color indication and simple text displaying. Thus, a user is easily able to know the current conditions of the recording/reproducing device simply by looking at the indication. Note that the color indication may be as follows. For example, using a color LCD as a display section, a displaying region of the LCD is successively shifted in the direction corresponding to the flow of data (i.e. moving direction), so that the direction of the data flow can be grasped.

As described, a recording/reproducing device of the present embodiment includes three disc devices, and a series of three display sections which are arranged on a front panel of the recording/reproducing device in the same manner as the three disc devices. These display sections are capable of indicating operation states of the disc devices and data moving conditions, by performing color indication and simple text displaying. Thus, a user is easily able to know the current conditions of the recording/reproducing device simply by looking at the indication. Note that the color indication may be as follows. For example, by using a color LCD as a display section, and by successively shifting a displaying region of the LCD in the direction the data is flowing (i.e., direction of moving), so that the direction of the data flow can be grasped.

Next, the following describes a first alternative form of the recording/reproducing device of the present embodiment. The above embodiment deals with a case where the third display section 43 in the middle performs text displaying. In the first alternative form, however, a symbol indicative of direction such as an arrow is used to indicate the direction in which data is moved. For example, when data is moved from a DVD to a BD, an arrow directed from the first display section 41 corresponding to the DVD device 31 towards the second display section 47 corresponding to the BD device 35 is displayed. When data is moved in the opposite direction, an arrow directed in the opposite direction is displayed. Furthermore, the directions of moving data between the HDD device 33 and an optical disc device (DVD device 31, and BD device 35) may be indicated as follows. A line dividing, in the longitudinal direction, the circle shape of the third display section 43 into two is deemed as the HDD device 33. By displaying an arrow indicative of a direction between the dividing line and the first or the second display section 41 or 47, it is possible to indicate the direction of moving data. With the first alternative form, the direction of moving data can be indicated by using a direction symbol which is easier to visually recognize than displaying text. Therefore, the first alternative form is advantageous in terms of easiness in understanding.

Next, the following describes a second alternative form of the recording/reproducing device of the present embodiment. The recording/reproducing device of the present alternative form is characterised in that a color to be indicated is changed in accordance with the type of reproduction signal of each device. For example, the type of reproduction signal of a device can be distinguished by: (i) whether or not a reproduction signal is the SD (Standard Definition) video signal or HD (High Definition) video signal; (ii) the compression methods such as MPEG-1, MPEG-2, MPEG-4; or (iii) DVD standards. For example, if the type of reproduction signals of devices are the same, the same color is used to indicate that the respective standards of the reproduction and recording sides are matches with each other, and therefore a dubbing process is possible. The color indication may be controlled so that the color indication is varied according to the type of a reproduction signal of each device (e.g. SD (Standard Definition) or HD (High Definition)). With the second alternative form, a recording format can be optimized when performing a dubbing process. It is further advantageous in that whether or not a dubbing process is possible is found out, prior to an operation. For example, in a case of HD (High Definition) signal, it is possible to easily select a display monitor with an optimal number of scan lines (resolution) or an HD-supported display monitor for the reproduction signal, by confirming the color indication according to the type of the reproduction signal. Thus, it is possible to realize an optimum combination of a quality of reproduction signal from the recording/reproducing device and a displaying quality of the display monitor.

Next, the following describes a third alternative form of a recording/reproducing device of the present invention. The recording/reproducing device of the present alternative form is basically the same as the recording/reproducing device of the embodiment described above. As is described, the recording/reproducing device of the present alternative form includes a position detection sensor 27 shown in the functional block diagram of FIG. 5. The recording/reproducing device of the present alternative form can be horizontally laid or put upright. Further, in a case of putting the recording/reproducing device upright, the position sensor senses that the device is put upright, and send the information to the CPU 3. The CPU 3 instructs the display control section 51 to change display mode of the display sections (first display section 41, third display section 43, and second display section 47) so that a direction of displaying on the LCD is rotated by 90°, and a user is able to properly read the displayed information. In this case, when scrolling what is displayed on the LCD, a user has to read it in the horizontal direction. However, this causes not particularly a concern. The recording/reproducing device of the present alternative form can be either laid horizontally or put upright. Therefore, a user is able to choose how to place the device based on conditions for setting the device and the user's preference. Moreover, the circular shape of the display sections (first display section 41, third display section 43, second display section 47) allows, without causing a strange feeling, a user to grasp the operation states of the disc devices and the direction of moving data.

As described, the recording/reproducing device of the present embodiment adopts a dual-tray mode which includes the DVD device 31 and the BD device 35, so that various complicated operations are possible. Indications of the operation states of the three disc devices including the HDD device 33 and the state of moving data are centralized to display sections which respectively corresponds to the disc devices A aligned on the front surface, and which are respectively provided for the disc devices. Thus, a user is able to easily grasp the working condition of each disc device. Further, it is possible to use a semiconductor storage device in place of the HDD device 33. In this case, it is possible to further reduce the thickness and weight of the recording/reproducing device.

An example of the semiconductor storage device is a data-rewritable nonvolatile memory such as: EPROM (Electrically Programmable Read Only memory), EEPROM (Electrically Erasable Programmable Read Only Memory), and a Flash memory.

Further, the recording/reproducing device of the present embodiment includes: the front panel 25a which is openable and closable. On the front panel 25a, the display unit 40 (first display section 41, third display section 43, and third display section 45) is provided, and the inner-display unit 48 (fourth display section 48a, sixth display section 48b, and fifth display section 48c) is provided on a surface of the casing which is exposed while the front panel is opened. Thus, an a large area for displaying is acquired. Furthermore, the first display section 41, the third display section 43, and the third display section 45 have a circular shape which is suggestive of an image of a disc. By making these display sections as large as possible, easy-to-follow displaying is possible.

The present embodiment deals with a case where the display unit 40 includes the first display section 41, the third display section 43, and the second display section 47 each serving as a substantially circular or a ring-shaped illuminating region. However, the display sections 41, 43, and 47 may be square, rectangle, diamond, star shape, or the like, and various shapes of the display sections are regarded as to fall within the scope of the present invention, provided that the display sections are distinguished by the types of the disc. Note, however, the shape of the display sections is preferably such that the same displaying can be performed in the longitudinal and horizontal directions, so that the recording/reproducing device can be laid horizontally or put upright. Further, the three regions for indication may be created by parting a single display region by two lines. Furthermore, each of the display sections on the front panel may also serve as an operation key.

In sum, the arrangement of the display section and the shape thereof are not particularly limited, provided that the number of display sections in the indicating unit 40 are not less that the number of the disc devices (DVD device 41, HDD device 33, and BD device 35), and that the display sections respectively indicate the operation conditions of the disc devices.

Further, the present embodiment deals with a case of a recording/reproducing device A of a dual-tray mode which device includes a single HDD device 33 and two optical disc device (DVD device 31, and BD device 35). However, the display control of the present invention is applicable in the similar way, irrespective of the number of the trays. As such, in particular, the display control of the present invention can be applied to a case of a triple-tray mode or the like. Further, the display control of the present invention is applicable to a multifunctional device in which a recording/reproducing device is built in one piece with a liquid crystal TV or the like, or a detachable recording/reproducing device.

Next, the following describes a fourth alternative form of the recording/reproducing device A according to the present invention. The structure of a recording/reproducing device A of the present alternative form is basically the same as that of the recording/reproducing device A described in the foregoing embodiment. The recording/reproducing device A of the present alternative form outputs a signal for controlling displaying to an external display device for displaying reproduced data from the recording/reproducing device, so as to notify (by displaying for example) the following information in association with the indication described in the above embodiment: respective working states of the recording/reproducing sections of the recording/reproducing device A; a working state of the entire recording/reproducing device A; or information regarding the direction of moving data amongst the recording/reproducing sections. The recording/reproducing device A has wireless or wired connection with the external display device via an interface section 15 (See FIG. 5). Examples of such an external display device are: a liquid crystal TV; a liquid crystal monitor; or a display section (external display section) of a mobile device (including LCD monitor of a mobile phone). For example, the recording/reproducing device A of the present alternative form includes an external-display control section which controls selection and output of a signal for causing the external display section to perform an OSD displaying.

For example, with the external-display control section, displaying of the working state of the entire recording/reproducing device, the respective operation states of the recording/reproducing sections, and the state of moving data can be performed on the external display section, in the similar manner to the displaying on the first display section 41, third display section 43, and the second display section 47 of the recording/reproducing device of the above-described embodiment.

As described, the recording/reproducing device A of the present alternative form includes the external-display control section for causing an external display device to display working states regarding the recording/reproducing device and the conditions of moving data. Thus, a user is able to know the working states or the data moving conditions, even in a case where the user is not able to clearly or directly see the displaying on the recording/reproducing device A because (i) the display sections 41, 43, and 47 are hidden in a rack where the recording/reproducing device A is placed or (ii) the user is operating the recording/reproducing device A from a distance. In this case, it is preferable that the user be able to remotely operate the recording/reproducing device with a use of a remote control device or the like, according to the confirmed state.

Next, the following describes a fifth alternative form of the recording/reproducing device A according to the present invention. The recording/reproducing device A of the present alternative form is basically the same as the recording/reproducing device of the fourth alternative form. However, the external-display control section of the recording/reproducing device A has a function such that a storage medium (i.e. DVD or BD) from which a video is currently reproduced is indicated in the form of the background color of the display of an external display device, or in the form of on-screen displaying (OSD) of symbols and characters (including logos of DVD and BD). Thus, for example, a user is able to know by referring to the displaying on the screen of the external display device the working state of the recording/reproducing device A, even if the working state is not displayed on the first, third, and second display sections 41, 43, and 47. Here, the display screen of the external display device may be parted to show information of plural storage media. It is further possible to notify the storage medium from which a video is currently reproduced, by means of vocal guidance.

Thus, the above recording/reproducing device A includes the external-display control section for carrying out control to display state information a working state of the recording/reproducing device in an external display device, which is separated from recording/reproducing device and serves to display images reproduced by the recording/reproducing device. Furthermore, the state information includes: information indicating the working state of the DVD device 31; and information indicating the working state of the BD device 35.

The external-display control section may carry out control to cause the external display device to display the state information by means of OSD display. Further, the external display control section may perform the operation so that the information indicating the working state of the DVD device 31 and the information indicating the working state of the BD device 35 are displayed in differing colors on the external display device.

Furthermore, the external display control section may perform the operation so that the information indicating the working state of the DVD device 31 is displayed alternately on the first display section 41 and on the external display device, and the information indicating the working state of the BD device 35 is indicated alternately on the second display section 47 and on the external display device.

The state information may include information for specifying a type of a storage medium accessed by the DVD device 31 or the BD device 35. Further, the recording/reproducing device A may include means for changing, according to an instruction from a user, various settings regarding display processes in the first display section 41, the second display section 47, and the external display device.

Thus, the embodiment and the alternative forms of the present embodiment are described in the above. It is further possible to adapt the recording/reproducing device A of the present invention so that the user is able to change the color or text for notifying the recording or reproduction by color indication or the like.

The following describes yet another alternative form. As shown in FIG. 3(*a*), in the foregoing embodiment, the first display section 41 includes: a circular light shielding plate 41*a*; and the ring-like light-transmitting section 41*b* provided around the periphery of the light-shielding plate 41*a*. Further, the second display section 47 includes: a circular light shielding plate 47a, and the ring-like light-transmitting section 47b provided around the periphery of the light-shielding plate 47a.

However, the first and the second display sections 41 and 47 may be provided with a circular instruction input button, instead of the circular light-shielding plate 41a and 47a. Further, the third display section 43 may be also configured by a circular instruction input button and a ring-like light transmitting section provided around the periphery of the instruction input button. The following describes in detail with reference to drawings an example where the instruction input button is adopted.

Figure 17:
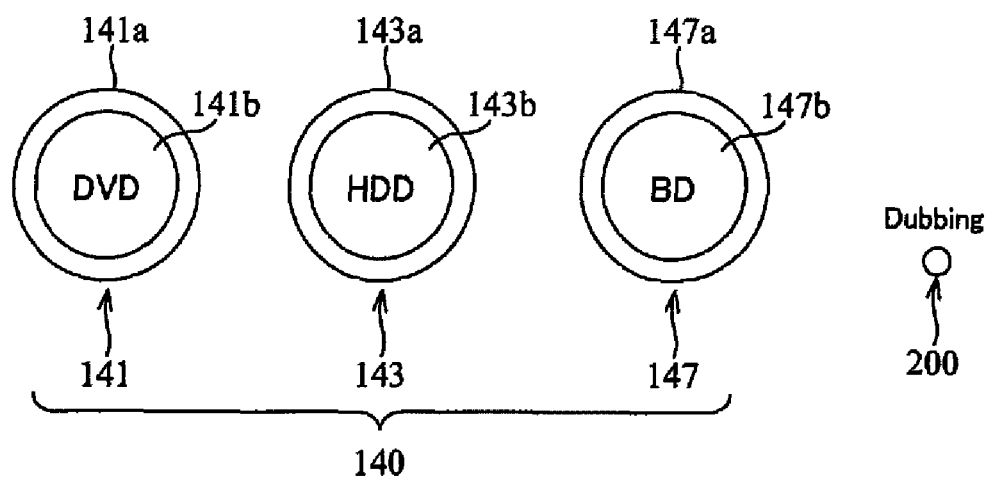
FIG. 17(a) is a pattern diagram of an alternative form of each display section on the front panel, and is showing display sections each of which displays various information items and accepts input of various information items in relation to the associated disc device.
FIG. 17(b) is a pattern diagram of the display sections shown in FIG. 17(a) each of which having illuminating regions on a color-by-color basis.
Figure 17:
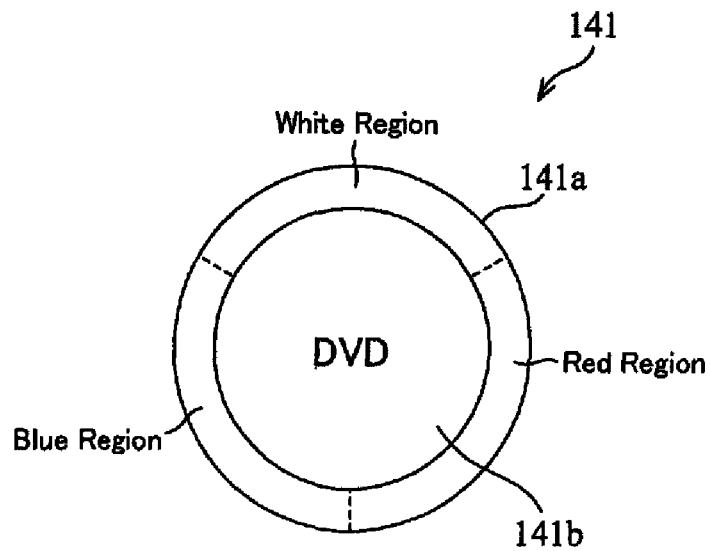

First, instead of the display unit 40 (See FIG. 1), a display unit 140 shown in FIG. 17(a) is provided on the front panel 25a of recording/reproducing device A. As shown in the figure, this display unit 140 includes: a first display section 141, a third display section 143, and a second display section 147.

The first display section 141 indicates various information and receives an input of various instructions, in relation to the DVD device 31. The first display section 141 includes: a circular button 141b having thereon a diagram or characters indicating DVD; and a light transmitting section 141a formed around the periphery of the button 141b. The button 141b receives an input of various instructions from a user in relation to the DVD device 31. The light transmitting section 141a notifies a user of an operation state of the DVD device 31 by emitting color indicating the user the operation state of the DVD device 31.

Through the button 141b, a plurality of different instructions can be input. For example, "reproduce-instruction" or "stop-instruction" is entered by gently pressing the button 141b once. By pressing the button 141b and holding it down for a predetermined period or longer, a "record-instruction" is entered. This setting however can be changed.

The light emission from the light transmitting section 141a is realized by transmitting light from a light source (LED). As shown in FIG. 17(b), the light transmitting section 141a includes: a white region for transmitting white light; a red region for transmitting red light; and a blue region for transmitting blue light. Here, the blue light means a reproduction is in process; the red light indicates that a recording is in process; and the white light indicates that the device is in a state of waiting for an instruction input (Hereinafter, standby mode).

The third display section 143 indicates various information and receives an input of various instructions, in relation to the HDD device 33. The third display section 143 includes: a circular button 143b having thereon a diagram or characters indicating HDD; and a light transmitting section 143a formed around the periphery of the button 143b. The button 143b receives an input of various instructions from a user in relation to the HDD device 33. The light transmitting section 143a notifies a user of an operation state of the HDD device 33, by emitting light of a color indicating the user the operation state of the HDD device 33.

As in the button 141b, a plurality of different instructions can be input via the button 143b.

Furthermore, as in the light transmitting section 141a, the light emission from the light transmitting section 143a is realized by transmitting light from a light source (LED). Further, as is the light transmitting section 141a, the light transmitting section 143a includes a blue region for transmitting white light indicating that a reproduction is in process; a red region for transmitting red light indicating that a recording is in process; and a region for transmitting white light indicating that the device is in the standby mode (not shown).

The second display section 147 indicates various information and receives an input of various instructions, in relation to the BD device 35. The second display section 147 includes: a circular button 147b having thereon a diagram or characters indicating BD; and a light transmitting section 147a formed around the periphery of the button 147b. The button 147b receives an input of various instructions from a user in relation to the BD device 35. The light transmitting section 147a notifies a user of an operation state of the BD device 35, by emitting light of a color indicating the user the operation state of the BD device 35.

As in the button 141b, a plurality of different instructions can be input via the button 147b.

Furthermore, as in the light transmitting section 141a, the light emission from the light transmitting section 147a is realized by transmitting light from a light source (LED). Further, as is the light transmitting section 141a, the light transmitting section 147a includes a white region for transmitting white light indicating that a reproduction is in process; a red region for transmitting red light indicating that a recording is in process; and a white region for transmitting white light indicating that the device is in the standby mode (not shown).

Next, the following describes examples of how the first display section 141, the third display section 143, and the second display section 147 are used.

Firstly, each of the first display section 141, the third display section 143, and the second display section 147 emit white light from the white region, when the associated disc device is in the standby mode. More specifically, while the DVD device 31 is in the standby mode, white light is emitted from the white region of the light transmitting section 141a of the first display section 141. While HDD device 33 is in the standby mode, white light is emitted from the white region of the light transmitting section 143a in the third display section 143. While BD device 35 is in the standby mode, white light is emitted from the white region of the light transmitting section 147a of the second display section 147.

Here, in a case of carrying out a reproduction or recording in the first display section 141, the third display section 143, or the second display section 147, a user can input an instruction of the reproduction or the recording by pressing a button of the corresponding display section.

For example, when the user inputs an instruction of reproduction by pressing the button 141b on the first display section 141 corresponding to the DVD device 31, the DVD device 31 starts a reproduction, and the blue and white regions of the light transmitting section 141a in the first display section 141 respectively emit blue light and white light. Note that the blue light indicates that the reproduction is in process, and the white light indicates that the device is in a state of waiting for input of further instruction (instruction to stop the reproduction).

When the user input the instruction to stop the reproduction by pressing the button 141b, the DVD device 31 stops the reproduction, and the blue region of the light transmitting section 141a in the first display section 141 is turned off.

Furthermore, for example, when the user inputs an instruction of the recording by pressing the button 141b on the first display section 141 corresponding to the DVD device 31, the DVD device 31 starts a recording, and the red and white regions of the light transmitting section 141a in the first display section 141 respectively emit red light and white light. Note that the red light indicates that the recording is in process, and the white light indicates that the device is in a state of waiting for input of further instruction (instruction to stop the recording). When the user inputs the instruction to stop the recording by pressing the button 141b, the DVD device 31 stops the recording operation, and the red region of the light transmitting section 141a in the first display section 141 is turned off.

Similarly, an instruction of reproduction or recording is given to the HDD device 33, by using the button 143b of the third display section 143 corresponding to the HDD device 33. While the HDD device 33 is performing a reproduction, the blue and white regions of the light transmitting section 143a in the third display section 143 respectively emit blue light and white light. While the HDD device 33 is performing a recording, the red and white regions of the light transmitting section 143a in the third display section 143 respectively emit red light and white light.

Similarly, an instruction of reproduction or recording is given to the BD device 35, by using the button 147b of the second display section 147 corresponding to the BD device 35. While the BD device 35 is performing a reproduction, the blue and white regions of the light transmitting section 147a in the second display section 147 respectively emit blue light and white light. While the BD device 35 is performing a recording, the red and white regions of the light transmitting section 147a in the second display section 147 respectively emit red light and white light.

In this configuration, a recording/reproducing device includes: disc devices such as the DVD device 31, the HDD device 33, and the BD device 35; and display sections respectively provided for these disc devices. Each of the display section is capable of displaying operation information of the disc device and capable of receiving an operation instruction from a user. Thus, even if there are plural disc devices, the user is able to easily grasp the operation condition of an intended disc device simply by looking at the display section corresponding to the disc device, and easily operate the disc device.

Next, the following describes an exemplary use of the first display section 141, the third display section 143, and the second display section 147, at a time of performing a dubbing. The following description deals with a case where a dubbing is performed from the HDD device 33 to the BD device 35.

Figure 18:
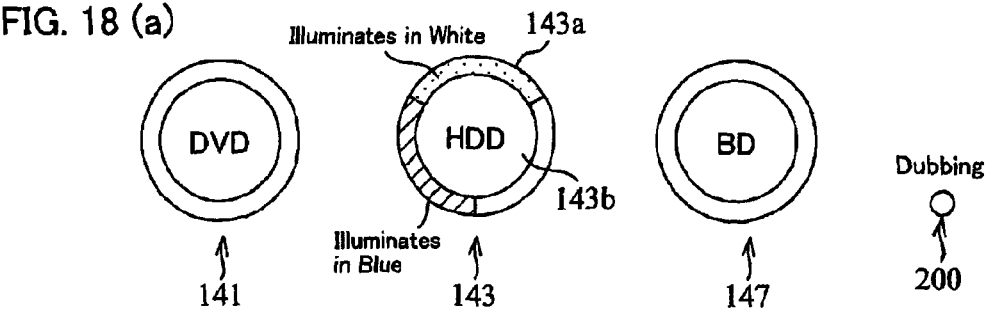
FIG. 18(a) is a pattern diagram of displaying modes of each display section on the front panel, and is showing a mode at the time of carrying out reproduction with respect an HDD device.
FIG. 18(b) is a pattern diagram of displaying modes of each display section on the front panel, and is showing a mode in a case where the reproduction operation of the HDD device transits to a stopping operation.
FIG. 18(c) is a pattern diagram of displaying modes of each display section on the front panel, and is showing a mode in a case where a dubbing button is pressed.
FIG. 18(d) is a pattern diagram of displaying modes of each display section on the front panel, and is showing a mode in a case where an HDD-device-to-DVD-device dubbing process is carried out.
Figure 18:
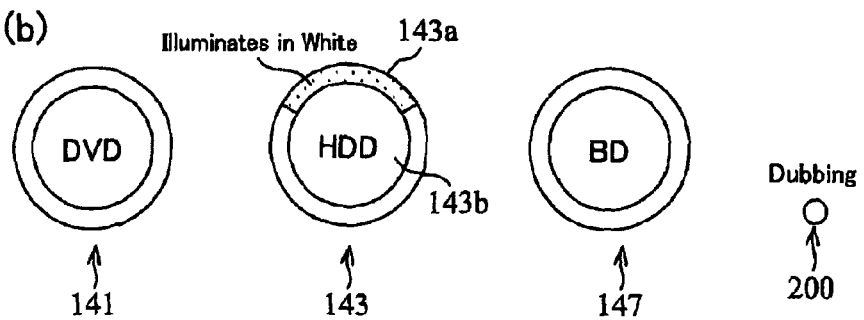
Figure 18:
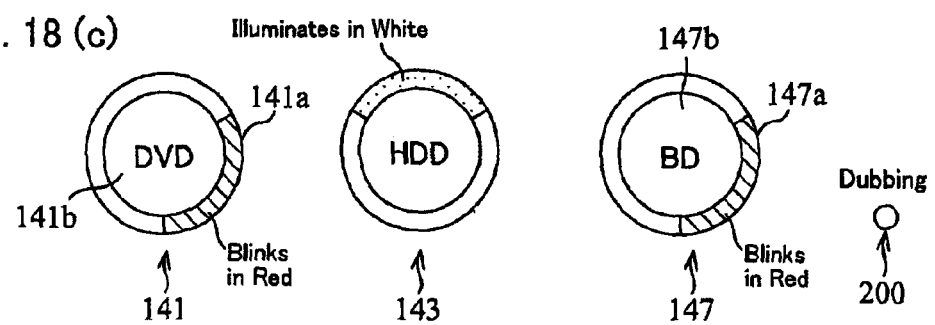
Figure 18:
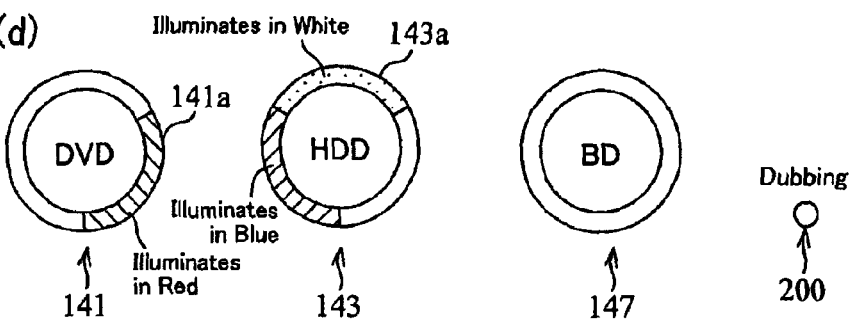

First, a user enters an instruction of a reproduction by pressing a button 143b in the third display section 143 corresponding to the HDD device 33, so that the HDD device 33 to enters the reproduction-state. In this way, the user confirms the dubbing-targeted title (program) stored in the HDD device 33. Note that, since the HDD device 33 is in the reproduction-state, the blue and white regions of the light transmitting section 143a in the third display section 143 respectively illuminate in blue and white, as shown in FIG. 18(a).

Next, the user inputs an instruction to stop the reproduction by pressing the button 143b, so as to temporarily stop the reproduction performed by the HDD device 33. Meanwhile, as shown in FIG. 18(b), the blue region of the light transmitting section 143a in the third display section 143 is turned off.

Here, when the user presses a dubbing button 200 provided nearby the display unit 140, a display section corresponding to a disc device to which data can be dubbed (Hereinafter, dubbing destination) blinks in red. Specifically, when the red region of the light transmitting section 141a in the first display section 141a is blinking, the DVD device 31 can be the dubbing destination. When the red region of the light transmitting section 147a in the second display section 147 is blinking, the BD device 35 can be can be the dubbing destination. In this example, as shown in FIG. 18(c), the red region of the light transmitting section 141a in the display section 141, and the red region of the light transmitting section 147a in the display section 147 are both blinking. Therefore, it is possible to choose either one of the DVD device 31 and the BD device 35 as the dubbing destination.

The dubbing destination is selected by pressing the button in the display section corresponding to the disc device which a user wishes to designate as the dubbing destination. In other words, by pressing the button 141b in the first display section 141, the DVD device 31 is selected as the dubbing destination. By pressing the button 147b in the second display section 147, the BD device 35 is selected as dubbing destination.

In this example, it is assumed that the user has designated the DVD device 31 as the dubbing destination by pressing the button 141b in the first display section 141. Thus, the HDD device 33 and the DVD device 31 start operating, and the dubbing targeted title (program) in the HDD device 33 is dubbed to a DVD in the DVD device 31.

As shown in FIG. 18(d), along with the start of the dubbing operation between the HDD device 33 and the DVD device 31, the blue and white regions of the light transmitting section 143a in the third display section 143 is turned on, the red region of the light transmitting section 141a in the first display section 141 transits from its blinking state to illuminating state, and the red region of the light transmitting section 147a in the second display section 147 is turned off.

As shown in FIG. 1 and FIG. 2, the recording/reproducing device A includes: a casing (device main body) 1; a DVD device (first recording/reproducing section) 31 which executes a process of reproducing/recording data to/from a DVD (first storage medium); and a BD device (second recording/reproducing section) 35 which executes a process of reproducing/recording data to/from a BD (second storage medium), each of the DVD device 31 and BD device 35 being arranged inside the casing 1.

Furthermore, the recording/reproducing device A includes, on an outer surface of the casing 1, a first display section 41 for indicating operation information indicating an operation state of the DVD device 31; and a second display section 47 for indicating operation information indicating an operation state of the BD device 35.

Here, in the recording/reproducing device A, the first and second display sections 41 and 47, the DVD device 31, and the BD device 35 are laid out so that a quadrangle is formed by: a first line segment connecting the center of the first display section 41 and the center of the second display section 47; a second line segment connecting the center of the DVD device 31 and the center of the BD device 35; a third line segment connecting the center of the first display section 41 and the center of the DVD device 31; a forth line segment connecting the center of the second display section 47 and the center of the BD device 35, where: the first and second line segments are opposed, and the third and fourth line segments are opposed.

With this configuration, the alignment order of the first display section 41 and the second display section 47 appears to the same as the alignment order of the DVD device 31 and the BD device 35 to the user when viewed from the opposite side of the display section. Thus, based on the alignment order of the first and the second display sections 41 and 47, the user is easily able to specify which display section indicates the operation information of which disc device. The reproducing/recording device A is thus user-friendly.

Further, as shown in FIG. 2, the casing 1 of the recording/reproducing device A includes a tray-front section (first inserting slot) 31a from which a DVD is inserted into the DVD device 31; and a tray-front section (second inserting slot) 35a from which a BD is inserted into the BD device 35. Further, in the recording/reproducing device A, the arrangement of the first display section 41, the second display section 47, the tray-front section 31a, and the tray-front section 35a are laid out so that a quadrangle is formed by: the first line segment connecting the center of the first display section 41 and the center of the second display section 47; a fifth line segment connecting the center of the tray-front section 31a and the center of the tray-front section 35a; a sixth line segment connecting the center of the first display section 41 and the center of the tray-front section 31a; a seventh line segment connecting the center of the second display section 47 and the center of the tray-front section 35a, where: the first and fifth line segments are opposed, and the sixth and seventh line segments are opposed.

As shown in FIG. 1 and FIG. 2, the recording/reproducing device A includes a front panel (openable-and-closable panel) 25a which covers the tray-front sections 31a and 35a in its closed state and exposes the tray-front sections 31a and 35a in its opened state the first display section 41 and the second display section 47 are formed on a plane of the front panel 25a, which plane is a reverse side of a surface 25d facing the tray-front sections 31a and 35a in the closed state of the front panel 25a.

Further, as shown in FIG. 1 and FIG. 2, the recording/reproducing device A includes: a fourth display section 48a and a fifth display section 48c which are exposed in the opened state of the front panel 25a with the tray-front sections 31a and 35a, and are covered by the front panel 25a in the closed state of the front panel 25a with the tray-front sections 31a and 35. Here, the fourth display section 48a and the fifth display section 48c notify the same operation information items as those notified by the first display section 41 and the second display section 47, respectively.

Furthermore, in the recording/reproducing device A, the first display section 41, the second display section 47, the fourth display section 48a, and the fifth display section 48c are laid out so that a quadrangle is formed by: an eighth line segment connecting the center of the fourth display section 48a and the center of the fifth display section 48c; the first line segment connecting the center of the first display section 41 and the center of the second display section 47; a ninth line segment connecting the center of the fourth display section 48a and the center of the first display section 41; and a tenth line segment connecting the center of the second display section 47 and the center of the fifth display section 48c, where the eighth and first line segments are opposed, and the ninth and tenth line segments are opposed.

The present invention may be expressed as a recording/reproducing device comprising: a first device for performing writing and/or reading of data with respect to a removable first storage medium; a second device for performing writing and/or reading of data with respect to a removable second storage medium; a first display section for notifying a working state of the first device; and a second display section for notifying a working state of the second device, a relative position of the first device to the second device being the same as a relative position of the first display section to the second display section.

The present invention may also be expressed as a recording/reproducing device comprising: a first device for performing writing and/or reading of data with respect to a first storage medium removable via a first insertion/ejection slot; a second device for performing writing and/or reading of data with respect to a second storage medium removable via a second insertion/ejection slot; a first display section for notifying a working state of the first device; and a second display section for notifying a working state of the second device, a relative position of the first device to the second device being the same as a relative position of the first display section to the second display section, a relative position of the first insertion/ejection slot to the second insertion/ejection slot being the same as a relative position of the first display section to the second display section.

The recording/reproducing device according to the present invention preferably further comprises: a third display section for notifying a working state of the recording/reproducing device, the third display section being provided between the first display section and the second display section.

The recording/reproducing device according to the present invention preferably further comprises: an openable-and-closable panel which covers, in its closed state, a storage medium insertion/ejection section of the first device and a storage medium insertion/ejection section of the second device, the first display section, the second display section and the third display section being so positioned as to be recognizable by a user in the closed-state of the openable-and-closable panel.

The recording/reproducing device according to the present invention preferably further comprises: a display section which also serves as operating switches of the recording/reproducing device, the display section being provided on the same surface where the insertion/ejection section exposed in an opened state of the openable-and-closable panel is provided The recording/reproducing device according to the present invention is preferably arranged so that: the storage medium insertion/ejection section of the first device and the storage medium insertion/ejection section of the second device are provided on a surface exposed in the opened state of the openable-and-closable panel, the surface thereon including a fourth display section, a fifth display section, and a sixth display section which differ from the first display section, the second display section and the third display section, but notify the same information items as those notified by the first display section, the second display section and the third display section, respectively.

The recording/reproducing device according to the present invention may be arranged so that one of the first device and the second device is a read-only device and the other is a write-only device.

The recording/reproducing device according to the present invention may further comprises: a third device for performing writing and/or reading of data with respect to a third storage medium, the third display section notifying a working state of the third device. The third device may be a hard disk device or a semiconductor storage device.

The recording/reproducing device according to the present invention may be arranged so that the third display section notifies a state between at least two of the first device, the second device and the third device.

The recording/reproducing device according to the present invention may be arranged so that the third display section notifies information including at least one of: (i) selected broadcast channel information of broadcast signals; (ii) external-input type information; (iii) external device information; and (iv) information of type of communications with the external device, which are externally acquired by the recording/reproducing device.

The recording/reproducing device according to the present invention may be arranged so that at least one of the first display section and the second display section notifies the working state in the form of distinction display including color indication or characters. The third display section may notify the working state in the form of distinction display including color indication or characters. The third display section may notify the working state by displaying text or symbols.

A recording/reproducing device according to the present invention may be expressed as a recording/reproducing device comprising within a single casing a plurality of recording/reproducing sections for performing writing and/or reading of data with respect to storage mediums, at least two recording/reproducing sections among the plurality of recording/reproducing sections having individual insertion/ejection slots, the recording/reproducing device including a first display section and a second display section for notifying working states of the two recording/reproducing sections, the first display section and the second display section being provided on a plane of the casing, opposed to insertion/ejection slots of the two recording/reproducing sections, respectively. The plurality of display sections are provided in separate sections respectively corresponding to the plural recording/reproducing sections.

A recording/reproducing device according to the present invention may also be expressed as a recording/reproducing device comprising within a single casing a plurality of recording/reproducing sections for performing writing and/or reading of data with respect to storage mediums, at least two second recording/reproducing sections of the plurality of recording/reproducing sections having individual insertion/ejection slots, the casing includes a movable panel which covers a plane of the casing having the insertion/ejection slots, the recording/reproducing device including a first display section and a second display section for notifying working states of the two recording/reproducing sections, the first display section and the second display section being provided on a surface of the casing, opposed to insertion/ejection slots of the two recording/reproducing sections, respectively. The plurality of display sections are provided in adjacent separate sections respectively corresponding to the plural recording/reproducing sections.

The first and second display sections may each have a circular-shape, an ellipsoidal-shape, or a ring-shape. The plurality of display sections may notify the working states in the form of distinction display including color indication or characters. The plural display sections may notify the data transition states between the recording/reproducing devices based on the relative position of adjacent recording/reproducing devices and notification of the working states regarding these recording/reproducing sections.

Further, the recording/reproducing device of the present invention may include a third display section for notifying a working state of a recording/reproducing device not including an insertion/ejection slot, the third display section being provided between the first and second display sections and the recording/reproducing device not including insertion/ejection slot. In this case, the working state of the recording/reproducing device not having the insertion/ejection slot or association between the working states of the recording/reproducing devices having the insertion/ejection slots may be notified in the form of distinction display such as color indication or display of characters. The recording/reproducing device not having an insertion/ejection slot may be a hard disk device.

The recording/reproducing device according to the present invention may be arranged so that an operation section for operating the recording/reproducing device is not provided on a plane on which the first and second display sections are formed.

The recording/reproducing device according to the present invention may be arranged so that an operation section for operating the recording/reproducing device is provided at least one of (i) the rear surface of the panel and (ii) a plane of the casing covered by the panel.

The recording/reproducing device according to the present invention may be arranged so that at least one of the recording/reproducing sections is an optical pickup device using an optical disc with a storage capacity of 8.6 GB for one side of storage medium. In this case, the hard disk device is disposed to be adjacent to the other recording/reproducing section in the thickness direction of the casing.

The recording/reproducing device of the present invention may include an external display control section for outputting to a display section (external display section, hereinafter) of an external display device (which displays data reproduced by the recording/reproducing device) control signals for controlling display state, which is used for displaying respective working states of the plural recording/reproducing sections, a working state of the recording/reproducing device, or association information regarding data transition in the recording/reproducing device.

The association display in the external display section may correspond to the display in the display section. Further, the display of association information in the external display section may include the background color of the external display section or text or symbols of OSD display. The display in the background color of the external display section may use different colors for each storage medium or insertion/ejection slot. The display of association information in the external display section may be associated with a storage medium being accessed at the moment. The display in the display section and the display of association information in the external display section may alternately appear by switching operation.

The recording/reproducing device of the present invention may have a function for setting/changing display in the display section or the external display section.

The present invention may be expressed as an operation state display method for a recording/reproducing device, which includes within a single casing a plurality of recording/reproducing sections for performing writing and/or reading of data with respect to a plurality of storage mediums, at least two recording/reproducing sections among the plurality of recording/reproducing sections having individual insertion/ejection slots, the method comprising the steps of: (a) detecting respective working states of the recording/reproducing device; and (b) displaying the respective working states of the recording/reproducing device in separate areas corresponding to the plural electronics devices. The step (b) including the sub-step of displaying working states of the electronic devices as plural distinction displays.

The above-described recording/reproducing device displays information related to working states of plural recording/reproducing sections in such a manner that the information is easy to visually recognize. Therefore, a user is able to recognize at a glance the working states of the plural recording/reproducing sections.

Further, a possible specific example of the above-described recording/reproducing device is a recording/reproducing device of a dual-tray mode having two optical devices, one of which is a Blue-ray disc device. Further, when the device main body is laid horizontally, the two optical disc devices of the recording/reproducing device are preferably laid out to be adjacent to each other in the horizontal direction (i.e., left and right).

Further, in the recording/reproducing device, a hard disk device is preferably provided above or below another optical disc device which is not the Blue-ray disc device. This restrains influence of vibration from the hard disk device on the Blue-ray disc device.

For example, the recording/reproducing device including two optical disc devices allows the following: directly dubbing of data between the optical discs; and insertion/ejection of a disc in/from one of the optical disc devices, while the other optical disc device is driven (accessed). It is further possible to simultaneously record pictures into the two optical discs. At this time, SD recording and HD recording can be performed for the DVD disc and the BD disc, respectively.

Further, with the recording/reproducing device, working states of the disc devices can be recognized by color changes in the plural display sections which are adjacently provided and are respectively associated with the disc devices. The changes in colors are also enjoyable as a visual effect.

Note that, in the recording/reproducing device, a display section associated with the hard disk device which functions as a server is provided between display sections associated with the optical disks. This allows for the easiest-to-understand displaying.

Further, in the recording/reproducing device, the positions of the display sections for displaying the working states of the recording/reproducing sections respectively correspond to the positions of the recording/reproducing sections, or the positions of the storage medium insertion/ejection slots of the recording/reproducing sections. Therefore, it is easy to understand the relationship between the display sections and various operation modes (e.g. "recording-mode", "reproduction-mode", "stop-mode") of the recording/reproducing sections. Thus, whether the recording/reproducing sections operate individually or in cooperation with the other recording/reproducing section, a user is able to grasp at a glance the respective operation states of the recording/reproducing sections, even from a distance. In other words, with the display sections being provided in adjacent regions, respectively corresponding to the recording/reproducing sections, a user is able to easily grasp the association between the display sections and the working states of the plural recording/reproducing sections.

Further, in a case where the first and second recording/reproducing sections are respectively performing different operations (reproduction and recording, or the like) which are associated with each other (i.e. process of recording reproduced information such as dubbing and copying), the recording/reproducing device of the present embodiment displays the state of association on the third display section located between the first and second display sections. From the positional relation amongst these three display sections, a user is able to guess that the display on the third display section relates to both the first and second recording/reproducing sections. Thus, the user is able to grasp the respective working states of the devices at a glance.

Further, with this positional relation amongst the three display sections, the operation states of the first and second recording/reproducing sections during a joint operation can be displayed on the third display section in an easy form which can be clearly understood by the user. For example, in a case where dubbing is performed from a DVD on the left side to a BD on the right (See FIG. 2), the state of performing the dubbing and data transition are clearly shown by simple display on the central third display section, such as an arrow indicating a direction (e.g. "→").

Further, the recording/reproducing device of the present embodiment allows not only reproduction and recording, but also abundant variety of operations including dubbing amongst discs and background-recording. Further, the recording/reproducing device of the present embodiment allows an effective use of two storage medium insertion/ejection slots and two discs, so that information from the two discs can be read at the same time. Hence, it is possible to reduce process delay inherent in DVD, which is caused when reading information from plural discs one-by-one by manually replacing the discs through a single storage medium insertion/ejection slot.

Further, with a movable panel being provided to the casing, a first display surface and a second display surface are respectively provided on the panel and on a casing surface which is exposed in the open state of the panel. Further, using the front surface and the back surface of the panel, a region for operation and a region for displaying are separated. Thus, it is possible to realize a large area for displaying. Displaying which is easier for user to understand is realized particularly by providing a large display section which is suggestive of a disc on the first display surface. Since an operation section of the recording/reproducing section is not provided on the first display surface exposed, it is possible to prevent a false operation when the user unintentionally touches the first display surface.

Further, the above-described recording/reproducing device may be expressed as a recording/reproducing device including: a plurality of recording/reproducing sections each for performing recording/reading of information with respect to a storage medium; a first working state display section for performing centralized displaying related to working states of recording/reproducing sections. Further, the recording/reproducing device may be adapted so that at least one of the plurality of the recording/reproducing sections is a read-only section. Further, the first working state display section may be provided in adjacent separate sections respectively corresponding to the plural recording/reproducing sections, and may include a plurality of display sections for respectively displaying working states of the recording/reproducing sections. Further, the plurality of display sections may notify the respective working states of the recording/reproducing sections by means of color indication using a plurality of colors.

Further, in the recording/reproducing device, each of the recording/reproducing sections may include a sensing section for detecting a working state of the recording/reproducing section, and the notification may be carried out based on the detection result of the working state of the recording/reproducing section.

Further, in the recording/reproducing device, at least one of the display sections may be a text/symbol display section which displays a working state of the recording/reproducing section in the form of text and/or symbol. Further, the text/symbol display section may be adapted so that a text string and/or a symbol string displayed is/are scrolled. Further, the text/symbol display section may include: an LCD display section which displays thereon text or a symbol; and an LED-light source which is capable of emitting light of plural colors and which also serves as a backlight or a front light of the LCD display section.

Further, the recording/reproducing device may be adapted so that, at least one of the recording/reproducing sections is a hard disk device, and a display section corresponding to the hard disk device is provided between display sections respectively corresponding to the other recording/reproducing sections.

It is also possible that at least one of the recording/reproducing sections is a semiconductor storage device, and that a display section corresponding to the semiconductor storage device is provided between display sections respectively corresponding to the other recording/reproducing sections. Further, each of the display sections is provided with an illuminating region having a circle-shape or a ring-like shape.

Further, in the recording/reproducing device, the recording/reproducing sections may be provided inside the casing, and the display sections may be provided on one of the surfaces of the casing.

Further, the recording/reproducing device may include a position sensor for sensing the direction in which the casing is placed. Based on the position of the casing detected by the position sensor, the direction of display on each of the display sections may be adjusted according to the placing condition, so that display is clearly seen by the user.

Further, in the recording/reproduction device, the casing may be provided with an openable-and-closable panel, and a first working state display section may be provided on the surface of the panel in the closed-state.

Further, the recording/reproducing device may include, on a surface of casing exposed in the open-state of the panel, a second working state display section which includes adjacent separate sections respectively corresponding to the recording/reproducing sections, and which is for the second working state display section displaying working states of the recording/reproducing sections.

Further, the recording/reproducing device may include an operation section for performing an operation of the recording/reproducing sections on a surface of the panel opposite to the surface having the first working state display section.

Further, the first and second working state display sections may share a common light source.

Further, the recording/reproducing device of the present embodiment may also be expressed as a recording/reproducing device including: a casing whose thickness in a first direction is thin; a first optical disc device contained in the casing; and a second optical disc device which is contained in the casing adjacent to the first optical disc device, in a second direction intersecting with the first direction.

Further, in the recording/reproducing device, one of the surfaces of the casing may be provided with display sections whose respective shapes are symbolic of the first or second optical disc device, and which sections respectively display working conditions of the first and second optical devices.

Further, in the recording/reproducing device, the second optical disc device may be a Blue-ray disc device which drives a Blue-ray disc. Further, the recording/reproducing device may include a hard disk device.

Further, in the recording/reproducing device, the hard disk device may be arranged adjacent to the first optical disc device in the first direction.

Further, the recording/reproducing device of the present embodiment may also be expressed as a recording/reproducing device including: a casing; at least first to third disc devices which are contained in the casing; a working state display section constituted of first to third display sections sequentially aligned in adjacent separate sections respectively corresponding to a first optical disc device, a hard disk device, and a second optical disc device, the working state display section being provided on one of the surfaces of the casing; sensing sections respectively provided for the disc devices, each of which detects a working state of a corresponding disc device; a display control section for performing display control so that the first to third display sections respectively notify working states of the disc devices in the form of plural distinction displays based on the detection results of the sensing sections, wherein the plural color displays includes: a first distinction display for notifying that the corresponding disc device is read for operation; a second distinction display for notifying that the corresponding disc device is currently under reproduction; and a third distinction display for notifying that the corresponding disc device is currently under recording.

Further, the respective distinction displays described above are color-based indications, and the second display sections for displaying a working state of the hard disk device may notify data transition information in the form of text or symbols, in addition to the distinction display.

Further, the recording/reproducing device according to the present embodiment may be expressed as an electronic apparatus comprising: a casing and a plurality of electronic devices, the electronic apparatus is characterized by further comprising a working state display section made of a plurality of display sections provided in adjacent separate regions on a plane of the casing, respectively corresponding to the plural electronic devices, sensing sections respectively provided for the plural electronic devices for detecting a working state for each electronic device; and a display control section for carrying out display control of the working state display section so that the working state display section notifies the working states of the electronic devices in the form of variable displays such as distinction displays, which are shown on the plural display sections, based on the detection results given by the sensing sections.

The present embodiment may be expressed as a display method comprising the steps of: (i) detecting working states of plural electronic devices; and (ii) separating information regarding working states of the plural electronic devices into plural items, and displaying intensively information of association between the electronic devices. Further, the display step (ii) may include a sub-step of displaying working states of the electronic devices with variable distinction displays. The foregoing steps may be carried out by executing a program by a computer.

With this recording/reproducing device, the information regarding the working states of the plural recording/reproducing sections can be displayed in a manner easily viewed by a user at a glance.

For example, the plural display sections may be structured to be capable of notifying the working states of the plural recording/reproducing sections by distinguishing them from each other by differing colors. In this case, the display section may serve as a text/symbol display section which displays the working states of the recording/reproducing sections using at least one of letters and symbols. In this case, the text/symbol display section preferably shows at least one of letters or symbols in the form of scroll display, which allows a user to more easily see the display.

Further, a hard disk device is preferably provided above or beneath an optical device other than a blue-ray disc device. This provides an effect of suppressing influence of vibration of a hard disk device onto the blue disc device.

Further, since the described recording/reproducing device includes two optical disc devices, direct dubbing between the plural optical discs becomes possible. Further, it also makes it possible to insert/eject a disk of one of the optical devices while driving (accessing) the other optical disc, or simultaneously record pictures into the two optical discs. At this time, SD recording and HD recording can be performed for the DVD disc and the BD disc, respectively.

Further, the recording/reproducing device may be expressed as a device adopting a dual-tray mode, comprising a casing whose first direction is thin; a first optical disc device provided in the casing; and a second optical disc device provided in the casing adjacent to the first optical disc device, in the second direction which intersects with the first direction. Further, the foregoing recording/reproducing device may comprise a first working state display section made of a plurality of display sections provided in adjacent separate regions on a front panel constituting a part of plane of the casing, respectively corresponding to the respective discs of the first and second optical disc devices and the hard disk device, sensing sections respectively provided for the plural disc devices for detecting a working state for each disc device; and a display control section for carrying out display control of the first working state display section so that the first working state display section notifies the working states of the disc devices in the form of plural colors shown on the plural display sections, based on the detection results given by the sensing sections. With this recording/reproducing device, the information regarding the working states of the plural optical disc devices and a hard disk device can be displayed in a manner easily viewed by a user. Further, the changes in the colors in the display of working states in the display sections provided in adjacent separates regions corresponding to the plural discs are also enjoyable as a visual effect.

Note that, in the disc device, a display section associated with the hard disk device which functions as a server is provided between display sections associated with the optical disks. This allows for the easiest-to-understand displaying.

In the foregoing recording/reproducing device, the working states of the plural recording/reproducing sections are intensively displayed. Therefore, it is easy to understand at a glance a complicated operation. In this case, with the display sections being provided in adjacent regions, respectively corresponding to the recording/reproducing sections, a user is able to easily grasp the association between the display sections and the working states of the plural recording/reproducing sections by seeing the intensive display section.

Further, the recording/reproducing device of the present embodiment allows not only reproduction and recording, but abundant variety of operations including dubbing amongst discs and background-recording. Further, the recording/reproducing device of the present embodiment makes it possible to reduce process delay which is an inherent in DVD, and which is caused when reading in disc information one-by-one by manually replacing the discs through a single storage medium insertion/ejection slot.

Further, with an openable-and-closable front panel and a first display surface provided on the front panel and a second display surface provided on a plane of the casing exposed in the open state of the panel; the display section can be enlarged. Particularly, it is possible to form a large display section on the first display surface with the design suggestive of a disc. This contributes to provide clearer display to the user.

Further, the user can visibly confirm the operational states of the two optical discs, the HDD and the three disc devices with the distinction display, which is color indication or the like shown in the display sections provided in the separate regions on the front panel, respectively corresponding to the plural disc devices by variable displays which change according to the working conditions. This allows the user to rapidly grasp the operational state, while maintaining visual effect of the display.

Moreover, the display section is capable of controlling its display so that it provides clear display to the user in both vertical and horizontal installations. On this account, the user can see the display from desired directions without difficulties. Particularly, the foregoing effect improves the usability of a recording/reproducing device having plural optical disc devices including BD.

The present invention is not limited to the description of the embodiments above, but may be altered by a skilled person within the scope of the claims. An embodiment based on a proper combination of technical means disclosed in different embodiments is encompassed in the technical scope of the present invention.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

INDUSTRIAL APPLICABILITY

The present invention is applicable as a displaying technology for a recording/reproducing device. Further, the present invention is applicable to other AV electronic devices other than the recording/reproducing device.

The invention claimed is:
1. A recording/reproducing device comprising
within a single casing a plurality of recording/reproducing sections for performing writing and/or reading of data with respect to storage mediums,
at least a first recording/reproducing section and a second recording/reproducing section of the plurality of recording/reproducing sections having individual insertion/ejection slots, the second recording/reproducing section performs writing and/or reading of data with respect to a disc using a blue light source whose wavelength is in the 400 nm band,
the recording/reproducing device including a first display section for notifying an operating state of the first recording/reproducing section and a second display section for notifying an operating state of the second recording/reproducing section, the first display section and the second display section being provided on one of the external faces of the casing, opposed to an insertion/ejection slot of the first recording/reproducing section and an insertion/ejection slot of the second recording/reproducing section, respectively,
wherein a third display section for notifying an operating state of the recording/reproducing device including display of information of recording/reproducing of the disc by the second recording/reproducing section, the third display section is provided between the first display section and the second display section, wherein
the plurality of recording/reproducing sections include a third recording/reproducing section which differs from the first or second recording/reproducing section, the third display section functions also to notify an operating state of the third recording/reproducing section,
wherein the third recording/reproducing section is a hard disk device,
wherein the second recording/reproducing section being more distant from the hard disk device than the first recording/reproducing section.

2. The recording/reproducing device as set forth in claim 1, wherein the first and second display sections each have a circular-shape, an ellipsoidal-shape, or a ring-shape.

3. The recording/reproducing device as set forth in claim 1, wherein the first and second display sections notify the operating states in the form of distinction display including color indication or characters.

4. The recording/reproducing device as set forth in claim 1, wherein the third display section notifies a state of joint process performed by the first recording/reproducing section and the second recording/reproducing section.

5. The recording/reproducing device as set forth in claim 1, wherein the third display section notifies the operating state in the form of color indication or display of characters.

6. A recording/reproducing device comprising within a single casing a plurality of recording/reproducing sections for performing writing and/or reading of data with respect to storage mediums, at least a first recording/reproducing section and a second recording/reproducing section of the plurality of recording/reproducing sections having individual insertion/ejection slots, the second recording/reproducing section performs writing and/or reading of data with respect to a disc using a blue light source whose wavelength is in the 400 nm band,
   the casing includes a movable panel which covers the insertion/ejection slots, the recording/reproducing device including a first display section for notifying a working state of the first recording/reproducing section, a second display section for notifying a working state of the second recording/reproducing section and a third display section for notifying an operating state of the recording/reproducing device including display of information of recording/reproducing of the disc by the second recording/reproducing section, the first display section and the second display section being provided to be opposed to an insertion/ejection slot of the first recording/reproducing section and an insertion/ejection slot of the second recording/reproducing section, respectively, the movable panel including the first display section and the second display section, which are provided on a plane of the panel, and which plane is a reverse side of a plane facing the insertion/ejection slots,
   wherein the plurality of recording/reproducing sections include a third recording/reproducing section which differs from the first or second recording/reproducing section, the third display section functions also to notify an operating state of the third recording/reproducing section,
   wherein the third recording/reproducing section is a hard disk device,
   wherein the second recording/reproducing section being more distant from the hard disk device than the first recording/reproducing section.

7. The recording/reproducing device as set forth in claim 6, wherein an operation section for operating the recording/reproducing device is not provided on a plane on which the first and second display sections are formed.

8. The recording/reproducing device as set forth in claim 6, wherein an operation section for operating the recording/reproducing device is provided at least one of (i) a plane of the casing covered by the movable panel and (ii) the plane of the panel facing the insertion/ejection slots.

9. A recording/reproducing device comprising:
   a device body;
   a first recording/reproducing section, provided inside the device body, for performing writing and/or reading of data with respect to a first storage medium;
   a second recording/reproducing section, provided in the device body, for performing writing and/or reading of data with respect to a disc using a blue light source whose wavelength is in the 400 nm band;
   a first display section for displaying operation information indicating an operation state of the first recording/reproducing section;
   a second display section for displaying operation information indicating an operation state of the second recording/reproducing section;
   a third display section for notifying an operating state of the recording/reproducing device including display of information of recording/reproducing of the disc by the second recording/reproducing section,
   wherein:
      the first display section, the second display section, the first recording/reproducing section and the second recording/reproducing section are laid out so that a quadrangle is formed by: a first line segment connecting the first display section and the second display section; a second line segment connecting the first recording/reproducing section and the second recording/reproducing section; a third line segment connecting the first display section and the first recording/reproducing section; a forth line segment connecting the second display section and the second recording/reproducing section, where the first and second line segments are opposed, and the third and fourth line segments are opposed, wherein
      the plurality of recording/reproducing sections include a third recording/reproducing section which differs from the first or second recording/reproducing section, the third display section functions also to notify an operating state of the third recording/reproducing section; and
      an openable-and-closable panel including the first display section and the second display section, wherein the first display section and the second display section are formed on an external surface of the panel in a closed state.

10. The recording/reproducing device as set forth in claim 9, wherein the first and second storage mediums are removable mediums, and the device body includes a first insertion slot for inserting the first storage medium to the first recording/reproducing section and a second insertion slot for inserting the second storage medium to the second recording/reproducing section,
   the first display section, the second display section, the first insertion slot and the second insertion slot are laid out so that a quadrangle is formed by: the first line segment connecting the first display section and the second display section; a fifth line segment connecting the first insertion slot and the second insertion slot; a sixth line segment connecting the first display section and the first insertion slot; a seventh line segment connecting the second display section and the second insertion slot, where the first and fifth line segments are opposed, and the sixth and seventh line segments are opposed.

11. The recording/reproducing device as set forth in claim 10, wherein the openable-and-closable panel covers the first and second insertion slots in its closed state and exposes the first and second insertion slots in its opened state.

12. The recording/reproducing device as set forth in claim 11, wherein the first display section and the second display section are formed on a plane of the openable-and-closable panel, which plane is a reverse side of a plane facing the first and second insertion slots.

13. The recording/reproducing device as set forth in claim 11, further comprising a first inner display section and a second inner display section which are exposed in the opened state with the first and second insertion slots, and are covered by the openable-and-closable panel in the closed state with the first and second insertion slots,
   wherein:

the first inner display section and the second inner display section notify the same information items as those notified by the first display section and the second display section, respectively.

14. The recording/reproducing device as set forth in claim 13, wherein the first display section, the second display section, the first inner display section and the second inner display section are laid out so that a quadrangle is formed by: an eighth line segment connecting the first inner display section and the second inner display section; the first line segment connecting the first display section and the second display section; a ninth line segment connecting the first inner display section and the first display section; a tenth line segment connecting the second inner display section and the second display section, where the eighth and first line segments are opposed, and the ninth and tenth line segments are opposed.

15. The recording/reproducing device as set forth in claim 13, wherein the first display section, the second display section, the first inner display section, and the second inner display section are each structured to be capable of receiving input instruction from a user so as to receive input instruction to a recording/reproducing section corresponding to operation information being displayed thereon.

16. The recording/reproducing device as set forth in claim 9, wherein the third display section is provided between the first display section and the second display section.

17. The recording/reproducing device as set forth in claim 16, further comprising a third recording/reproducing section for performing data writing to a third storage medium and data reading from the first storage medium,
wherein:
the third display section displays operation information indicating an operation state of the third recording/reproducing section.

* * * * *